United States Patent
Redding et al.

(10) Patent No.: US 10,834,154 B1
(45) Date of Patent: Nov. 10, 2020

(54) DYNAMIC CONFIGURATION OF STREAM PARAMETERS BASED ON MODULATION SCHEME

(71) Applicant: QUALCOMM Incorporated, San Diego, CA (US)

(72) Inventors: Brian Redding, Urbana, IL (US); Joel Linsky, San Diego, CA (US); Robin Heydon, Cambridge (GB)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/387,036

(22) Filed: Apr. 17, 2019

(51) Int. Cl.
| | |
|---|---|
| *G06F 15/16* | (2006.01) |
| *H04L 29/06* | (2006.01) |
| *H04W 76/15* | (2018.01) |
| *H04L 27/00* | (2006.01) |
| *H04W 24/08* | (2009.01) |

(52) U.S. Cl.
CPC ...... *H04L 65/4069* (2013.01); *H04L 27/0012* (2013.01); *H04L 65/607* (2013.01); *H04W 24/08* (2013.01); *H04W 76/15* (2018.02)

(58) Field of Classification Search
CPC .. H04L 65/4069; H04L 65/607; H04W 76/15; H04W 24/08
USPC .................................. 709/217–219, 227–228
See application file for complete search history.

(56) References Cited

U.S. PATENT DOCUMENTS

| | | | | |
|---|---|---|---|---|
| 8,340,003 | B2 * | 12/2012 | Tsai ..................... | H04L 1/1845 |
| | | | | 370/282 |
| 9,763,120 | B2 * | 9/2017 | Yu .......................... | H04W 76/15 |
| 9,930,477 | B2 * | 3/2018 | Song ..................... | H04W 76/10 |
| 10,333,649 | B1 * | 6/2019 | Oroskar ................ | H04L 47/263 |
| 10,505,674 | B2 * | 12/2019 | Shen ..................... | H04L 1/0061 |
| 10,595,137 | B2 * | 3/2020 | Pedersen ............. | H04L 65/1069 |
| 10,666,998 | B2 * | 5/2020 | McGinn ................ | H04L 65/607 |
| 2016/0309481 | A1 * | 10/2016 | Verma ................... | H04W 24/08 |
| 2016/0359925 | A1 * | 12/2016 | Song ..................... | H04W 4/80 |

(Continued)

*Primary Examiner* — Bharat Barot
(74) *Attorney, Agent, or Firm* — Kevin M. Donnelly

(57) ABSTRACT

This disclosure provides methods, devices and systems for signaling modulation schemes and stream parameters such that the modulation schemes and stream parameters can be adapted dynamically while maintaining an existing wireless connection. Some implementations include signaling, via a first channel, a set of stream parameters that govern communications on a second channel when a particular modulation scheme is used to modulate the packets transmitted via the second channel. A transmitting device may select a respective set of stream parameters for each of multiple modulation schemes. For example, in addition to an initial modulation scheme and set of stream parameters, the transmitting device can select alternative modulation schemes and sets of stream parameters that are optimized for the respective modulation schemes. The transmitting device signals the modulation schemes and the respective sets of stream parameters via the first channel in advance of switching modulation schemes for the second channel. The transmitting device is enabled to change the modulation scheme and the set of stream parameters on the fly by including an indication of the modulation scheme in the next packet it transmits via the second channel.

32 Claims, 13 Drawing Sheets

(56) References Cited

U.S. PATENT DOCUMENTS

2018/0302189 A1* 10/2018 Harrod, IV ........... H04W 24/08
2020/0022204 A1* 1/2020 Husted ................. H04W 24/10

* cited by examiner

DYNAMIC CONFIGURATION OF STREAM PARAMETERS BASED ON MODULATION SCHEME

TECHNICAL FIELD

This disclosure relates generally to wireless communication, and more specifically, to techniques for signaling modulation schemes and stream parameters such that the modulation schemes and the stream parameters can be adapted dynamically while maintaining an existing wireless connection.

DESCRIPTION OF THE RELATED TECHNOLOGY

A wireless local area network (WLAN), wireless personal area network (WPAN) or Internet of Things (IoT) network may be formed by a number of devices that share a wireless communication medium. Such a network may be an example of an ad hoc network in which the devices can communicate directly with one another via wireless links. For example, the network may be a Bluetooth® network and the devices may be Bluetooth®-compliant devices. A Bluetooth®-compliant device can be any device that implements one or more of the Bluetooth® wireless communication protocols as defined by the IEEE 802.15 standards or the Bluetooth Special Interest Group (SIG) standards, for example, including the Bluetooth 4.0 Specification and the Bluetooth 5.0 Specification. Bluetooth® refers to a set of short-range wireless communication protocols including the Basic Rate (BR) core configuration, the Enhanced Data Rate (EDR) configuration, and the Low Energy (LE) core configuration as, for example, defined in Bluetooth SIG Specification Versions 4.0 and 5.0. Both the BR physical layer (PHY) and the LE PHY operate in the unlicensed Industrial, Scientific and Medical (ISM) 2.4 GHz short-range radio frequency band (2400-2483.5 MHz). Bluetooth-compliant devices may transmit and receive wireless packets to and from one another according to a master/slave architecture. Additionally or alternatively, Bluetooth-compliant devices may transmit and receive Bluetooth packets according to a broadcaster/scanner architecture.

In some existing Bluetooth communication modes, the transmitting device is not able to dynamically change the modulation scheme, and thus the data rate, of the payload without first terminating the wireless link between the transmitting and receiving devices and subsequently reestablishing the wireless link with the new modulation scheme. Similarly, the transmitting device is not able to dynamically change the configuration settings (or "stream parameters") for an associated channel without first terminating the wireless link and subsequently reestablishing the wireless link with the new stream parameters. The inability to dynamically switch the modulation scheme and the stream parameters results in unnecessary latency due to the time required to terminate and reestablish the wireless link. As a result of the time penalty involved with changing the modulation scheme and stream parameters, it is typically the case that a relatively conservative modulation scheme and corresponding set of stream parameters are selected to provide for increased sensitivity to guarantee reliability even when it is not necessary. The use of a conservative modulation scheme may necessitate additional time resources when transmitting longer packets, thus reducing the throughput of the system.

SUMMARY

The systems, methods and devices of this disclosure each have several innovative aspects, no single one of which is solely responsible for the desirable attributes disclosed herein.

One innovative aspect of the subject matter described in this disclosure can be implemented in a method for wireless communication. The method includes establishing a connection with a second wireless communication device including a first channel and a second channel. The establishment of the connection includes receiving a first packet via the first channel that indicates a first modulation scheme for transmitting and receiving packets via the second channel. The first packet further indicates a first set of stream parameters associated with the second channel for the transmission and the reception of the packets using the first modulation scheme. The method includes listening for packets on the second channel based on the first set of stream parameters. The method also includes receiving a second packet via the first channel. The second packet indicates a second modulation scheme for transmitting and receiving packets via the second channel. The second packet further indicates a second set of stream parameters associated with the second channel for the transmission and the reception of the packets using the second modulation scheme. The second set of stream parameters includes at least one stream parameter that is different than a corresponding stream parameter in the first set of stream parameters. The method then includes receiving a packet via the second channel, the packet including an indication of the second modulation scheme and a payload modulated according to the second modulation scheme. The method also includes determining that the third packet has been modulated according to the second modulation scheme based on the indication. The method further includes, responsive to the determination that the third packet has been modulated according to the second modulation scheme, and while maintaining the connection, demodulating the third packet based on the second modulation scheme and switching from listening for packets on the second channel based on the first set of stream parameters to listening for packets on the second channel based on the second set of stream parameters.

Another innovative aspect of the subject matter described in this disclosure can be implemented in a wireless communication device. The wireless communication device includes at least one modem, at least one processor coupled with the at least one mode, and at least one memory communicatively coupled with the at least one processor and storing processor-readable code that, when executed by the at least one processor, is configured to cause the wireless communication device to establish a connection with a second wireless communication device including a first channel and a second channel. The establishment of the connection includes receiving a first packet via the first channel that indicates a first modulation scheme for transmitting and receiving packets via the second channel. The first packet further indicates a first set of stream parameters associated with the second channel for the transmission and the reception of the packets using the first modulation scheme. The processor-readable code is further configured to cause the wireless communication device to listen for packets on the second channel based on the first set of stream parameters. The processor-readable code is further configured to cause the wireless communication device to receive a second packet via the first channel. The second packet indicates a second modulation scheme for transmitting and receiving packets via the second channel. The second packet further indicates a second set of stream parameters associated with the second channel for the transmission and the reception of the packets using the second modulation scheme. The second set of stream parameters includes at least one stream parameter that is different than a corresponding stream parameter in the first set of stream parameters. The processor-readable code is further configured to cause the wireless communication device to receive a packet via the second channel, the packet including an indication of the second modulation scheme and a payload modulated according to the second modulation scheme. The processor-readable code is further configured to cause the wireless communication device to determine that the third packet has been modulated according to the second modulation scheme based on the indication. The processor-readable code is further configured to cause the wireless communication device to, responsive to the determination that the third packet has been modulated according to the second modulation scheme, and while maintaining the connection, demodulate the third packet based on the second modulation scheme and switch from listening for packets on the second channel based on the first set of stream parameters to listening for packets on the second channel based on the second set of stream parameters.

In some implementations of the methods and wireless communication devices, the connection includes an Asynchronous Connection-Oriented link and the first channel is associated with the Asynchronous Connection-Oriented link. In some implementations of the methods and wireless communication devices, the connection includes a Connected Isochronous Stream (CIS) link and the second channel is associated with the CIS link.

In some implementations of the methods and wireless communication devices, each of the first set of stream parameters and the second set of stream parameters includes at least one of a maximum packet size for transmissions to the second wireless communication device, a maximum packet size for transmissions from the second wireless communication device, a maximum number of subevents in each isochronous interval, a subevent interval, a burst number for transmissions to the second wireless communication device, a burst number for transmissions from the second wireless communication device, a flush timeout for transmissions to the second wireless communication device, a flush timeout for transmissions from the second wireless communication device, or an isochronous channel interval.

In some implementations, the methods and wireless communication devices are further configured to output for transmission a first response packet via the first channel, the first response packet including an indication that the first wireless communication device supports the first modulation scheme and the first set of stream parameters. Similarly, in some implementations, the methods and wireless communication devices are further configured to output for transmission a second response packet via the first channel, the second response packet including an indication that the first wireless communication device supports the second modulation scheme and the second set of stream parameters.

In some implementations of the methods and wireless communication devices, the third packet includes a physical layer field and a subsequent physical layer payload, the physical layer field including a modulation scheme field that indicates the second modulation scheme used to modulate the physical layer payload.

In some implementations, the methods and wireless communication devices are further configured to update a mapping table that maps modulation schemes to corresponding sets of stream parameters, the updating including mapping the first modulation scheme to the first set of stream parameters and mapping the second modulation scheme to the second set of stream parameters, wherein the switching from the listening for packets based on the first set of stream parameters to the listening for packets based on the second set of stream parameters comprises querying the mapping table based on the second modulation scheme and identifying the second set of stream parameters based on the querying.

Another innovative aspect of the subject matter described in this disclosure can be implemented in a method for wireless communication. The method includes establishing a connection with a second wireless communication device including a first channel and a second channel. The establishment of the connection includes outputting for transmission a first packet via the first channel that indicates a first modulation scheme for transmitting and receiving packets via the second channel. The first packet further indicates a first set of stream parameters associated with the second channel for the transmission and the reception of the packets using the first modulation scheme. The method also includes outputting for transmission a second packet via the first channel, the second packet indicating a second modulation scheme for transmitting and receiving packets via the second channel. The second packet further indicates a second set of stream parameters associated with the second channel for the transmission and the reception of the packets using the second modulation scheme. The second set of stream parameters includes at least one stream parameter that is different than a corresponding stream parameter in the first set of stream parameters. The method additionally includes determining whether to switch from the first modulation scheme to the second modulation scheme for transmitting and receiving packets via the second channel. Based on determining to switch from the first modulation scheme to the second modulation scheme, and while maintaining the connection, the method further includes outputting for transmission a third packet via the second channel based on the second set of stream parameters, the third packet including a payload modulated according to the second modulation scheme, the third packet including a modulation scheme field that indicates the second modulation scheme.

Another innovative aspect of the subject matter described in this disclosure can be implemented in a wireless communication device. The wireless communication device includes at least one modem, at least one processor coupled with the at least one modem, and at least one memory communicatively coupled with the at least one processor and storing processor-readable code that, when executed by the at least one processor, is configured to cause the wireless communication device to establish a connection with a second wireless communication device including a first channel and a second channel. The establishment of the connection includes outputting for transmission a first packet via the first channel that indicates a first modulation scheme for transmitting and receiving packets via the second channel. The first packet further indicates a first set of stream parameters associated with the second channel for the transmission and the reception of the packets using the first modulation scheme. The processor-readable code is further configured to output for transmission a second packet via the first channel, the second packet indicating a second modulation scheme for transmitting and receiving packets via the second channel. The second packet further indicates a second set of stream parameters associated with the second channel for the transmission and the reception of the packets using the second modulation scheme. The second set of stream parameters includes at least one stream parameter that is different than a corresponding stream parameter in the first set of stream parameters. The processor-readable code is further configured to determine whether to switch from the first modulation scheme to the second modulation scheme for transmitting and receiving packets via the second channel. Based on determining to switch from the first modulation scheme to the second modulation scheme, and while maintaining the connection, the processor-readable code is further configured to output for transmission a third packet via the second channel based on the second set of stream parameters, the third packet including a payload modulated according to the second modulation scheme, the third packet including a modulation scheme field that indicates the second modulation scheme.

In some implementations of the methods and wireless communication devices, the connection includes an ACL link and the first channel is associated with the ACL link. In some implementations of the methods and wireless communication devices, the connection includes a CIS link and the second channel is associated with the CIS link.

In some implementations of the methods and wireless communication devices, each of the first set of stream parameters and the second set of stream parameters includes at least one of a maximum packet size for transmissions to the second wireless communication device, a maximum packet size for transmissions from the second wireless communication device, a maximum number of subevents in each isochronous interval, a subevent interval, a burst number for transmissions to the second wireless communication device, a burst number for transmissions from the second wireless communication device, a flush timeout for transmissions to the second wireless communication device, a flush timeout for transmissions from the second wireless communication device, or an isochronous channel interval.

In some implementations, the methods and wireless communication devices are further configured to receive a first response packet via the first channel, the first response packet including an indication that the second wireless communication device supports the first modulation scheme and the first set of stream parameters receiving a second response packet via the first channel. Similarly, in some implementations, the methods and wireless communication devices are further configured to receive a second response packet via the first channel, the second response packet including an indication that the second wireless communication device supports the second modulation scheme and the second set of stream parameters.

In some implementations of the methods and wireless communication devices, the third packet includes a physical layer field and a subsequent physical layer payload, the physical layer field including the modulation scheme field that indicates the second modulation scheme used to modulate the physical layer payload.

In some implementations, the methods and wireless communication devices are further configured to maintain a mapping table that maps modulation schemes to corresponding sets of stream parameters, the mapping table mapping the first modulation scheme to the first set of stream parameters and mapping the second modulation scheme to the second set of stream parameters.

In some implementations, the methods and wireless communication devices are further configured to determine at least one channel condition of the second channel, and the determination of whether to switch from the first modulation scheme to the second modulation scheme is based on the at least one channel condition.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
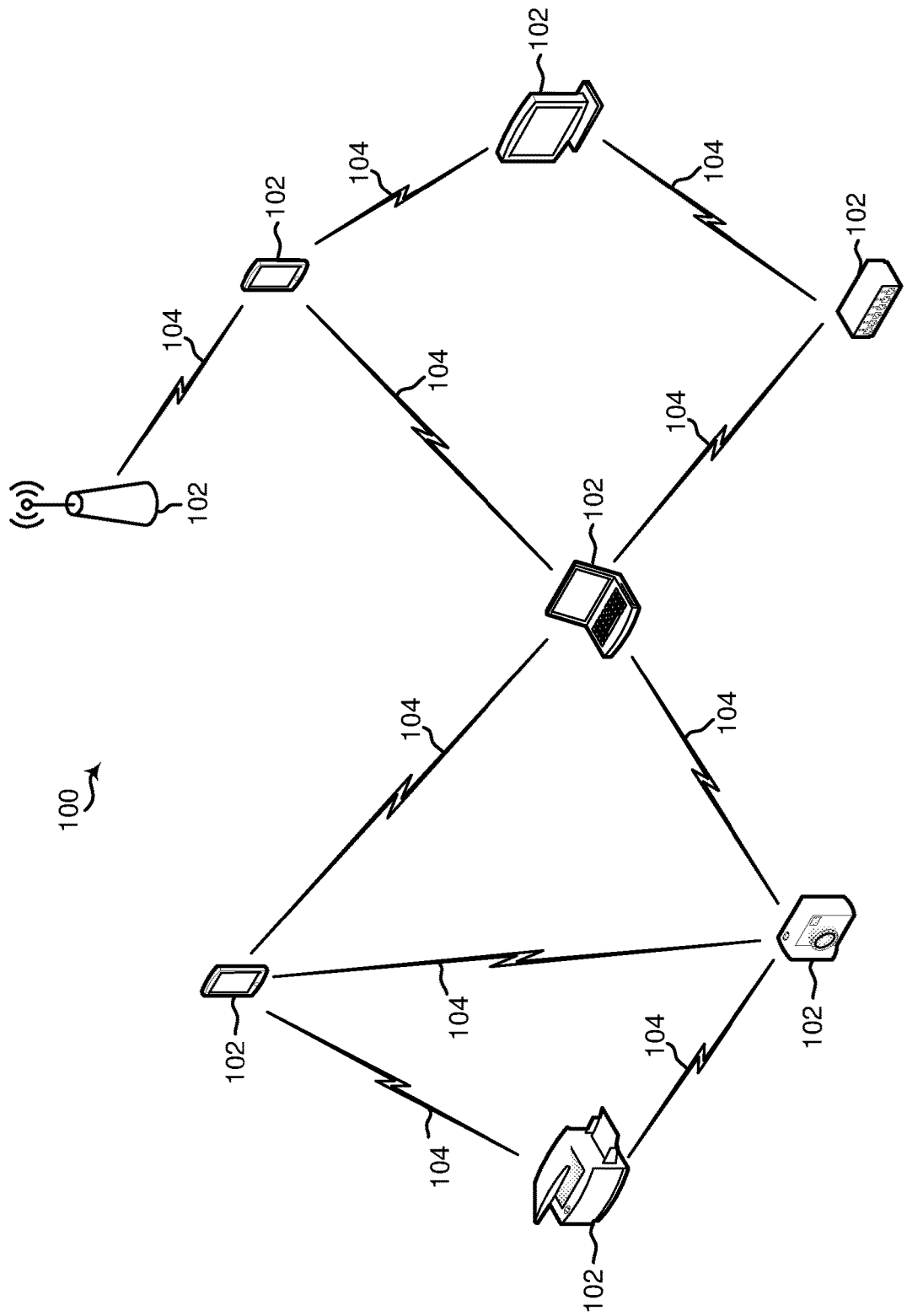
FIG. 1 shows a pictorial diagram of an example wireless communication network.

The following description is directed to certain implementations for the purposes of describing innovative aspects of this disclosure. However, a person having ordinary skill in the art will readily recognize that the teachings herein can be applied in a multitude of different ways. The described implementations can be implemented in any device, system or network that is capable of transmitting and receiving radio frequency (RF) signals according to one or more of the Institute of Electrical and Electronics Engineers (IEEE) 802.11 standards, the IEEE 802.15 standards, and the Bluetooth® standards as defined by the Bluetooth Special Interest Group (SIG). The described implementations can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), single-user (SU) multiple-input multiple-output (MIMO) and multi-user (MU) MIMO. The described implementations also can be implemented using other wireless communication protocols or RF signals suitable for use in one or more of a wireless personal area network (WPAN), a wireless local area network (WLAN), or an internet of things (TOT) network.

Various implementations relate generally to techniques for signaling modulation schemes and stream parameters such that the modulation schemes and the stream parameters can be adapted dynamically while maintaining an existing wireless connection. Some implementations more specifically relate to signaling, via a first channel, a set of stream parameters (also referred to as "channel parameters" or "configuration settings") that govern communications on a second channel when a particular modulation scheme is used to modulate the packets transmitted via the second channel. In some implementations, a transmitting device selects a respective set of stream parameters for each of multiple modulation schemes. For example, in addition to a default, initial or baseline modulation scheme and corresponding set of stream parameters, the transmitting device can select alternative modulation schemes and corresponding sets of stream parameters that are optimized for the respective modulation schemes, for example, to achieve an advantageous combination of throughput, latency and reliability. In some implementations, the transmitting device signals the modulation schemes and the respective sets of stream parameters to be used with the modulation schemes via the first channel (for example, a control channel) in advance of switching modulation schemes for the second channel (for example, a channel that carries data). The transmitting device is enabled to change the modulation scheme and the corresponding set of stream parameters for the second channel on the fly, and while maintaining the connection, by including an indication of the modulation scheme in the header of the next packet it transmits via the second channel. For example, the transmitting device may monitor the link quality associated with the second channel and determine that it would be advantageous to switch modulation schemes as channel conditions change, for example, to switch to a higher data rate to provide increased throughput, or to switch to a lower data rate to achieve more sensitivity and reliability. Based on reading the header and identifying the modulation scheme, the receiving device can then identify the corresponding set of stream parameters based on the earlier signaling. In some implementations, the transmitting and receiving devices maintain respective tables mapping the modulation schemes to the respective sets of stream parameters.

Particular implementations of the subject matter described in this disclosure can be implemented to realize one or more of the following potential advantages. As described above, the described techniques can be used to dynamically switch modulation schemes as channel conditions change while maintaining a connection, for example, to switch to a higher data rate to provide increased throughput, or to switch to a lower data rate to achieve more sensitivity and reliability. Furthermore, the described techniques also enable the dynamic switching of corresponding sets of stream parameters that are optimized for the respective modulation schemes, for example, to achieve an advantageous combination of throughput, latency and reliability. Additionally, some implementations provide improved coexistence with other radio access technologies, such as Wi-Fi, because the transmitting device may increase the modulation scheme, and thus the data rate, for communications on the second channel, thereby reducing or minimizing the time, frequency or antenna resources necessary for the second channel and enabling more resources to be dedicated to the other radio access technologies. Additionally, some implementations permit the use of a new extended length packet permitting more data to be carried by each packet, which, when combined with a higher data rate, increases the throughput of the system.

FIG. 1 shows a pictorial diagram of an example wireless communication network 100. In various implementations, the wireless communication network 100 can be an example of a wireless local area network (WLAN) or a wireless personal area network (PAN). The wireless communication network (hereinafter "wireless network") 100 may include multiple wireless communication devices including stations (STAs) 102. Each of the STAs 102 also may be referred to as a mobile station (MS), a mobile device, a mobile handset, a wireless handset, an access terminal (AT), a user equipment (UE), a subscriber station (SS), or a subscriber unit, among other possibilities. The STAs 102 may represent various devices such as mobile phones, personal digital assistant (PDAs), other handheld devices, netbooks, notebook computers, tablet computers, laptops, display devices (for example, TVs, computer monitors, navigation systems, among others), music or other audio or stereo devices (for example, audio headphones or ear buds), remote control devices ("remotes"), printers, copiers, kitchen or other household appliances, key fobs (for example, for passive keyless entry and start (PKES) systems), among other possibilities.

The wireless network 100 is an example of an ad hoc network. The STAs 102 can communicate directly with one another via wireless links 104. In some implementations, the wireless network 100 is an example of a Bluetooth® network and the STAs 102 are Bluetooth®-compliant devices. A Bluetooth® device can be any device, such as a Bluetooth-compliant STA 102, that implements one or more of the Bluetooth® wireless communication protocols as defined by the IEEE 802.15 standards or the Bluetooth Special Interest Group (SIG) standards, for example, including the Bluetooth 4.0 Specification and the Bluetooth 5.0 Specification. Bluetooth refers to a set of short-range wireless communication protocols including the Basic Rate (BR) core configuration, the Enhanced Data Rate (EDR) configuration, and the Low Energy (LE) core configuration as, for example, defined in Bluetooth SIG Specification Versions 4.0 and 5.0. The BR, EDR and LE physical layers (PHYs) operate in the unlicensed Industrial, Scientific and Medical (ISM) 2.4 GHz short-range radio frequency band (2400-2483.5 MHz) and may utilize frequency-hopping spread spectrum radio technology.

Bluetooth-compliant STAs 102 (hereinafter "STAs 102") may transmit and receive Bluetooth communications (for example, in the form of Bluetooth packets) to and from one another over wireless links 104 (hereinafter also referred to as "Bluetooth links") according to a master/slave architecture. Additionally or alternatively, STAs 102 may transmit and receive Bluetooth packets according to a broadcaster/scanner architecture. In the master/slave architecture, one of the STAs 102, referred to as the master, provides clock synchronization to the other STAs 102, which are referred to as slaves. During typical operation, a physical radio channel can be shared by multiple STAs 102 (referred to as a "piconet"). The STAs 102 of a Bluetooth piconet are synchronized to the common clock and frequency (channel) hopping pattern specified by the master. A master STA 102 may have wireless links with multiple slave STAs 102 simultaneously. Similarly, a slave STA 102 may be permitted to have wireless links to more than one master STA 102 at a time. Additionally, a STA 102 may be permitted to have the role of both master and slave at the same time; for example, a STA 102 may be a master as it pertains to a first wireless link with another STA 102 while simultaneously being a slave as it pertains to a second wireless link with yet another STA 102.

According to the Bluetooth Specification, packets in the form of protocol data units (PDUs) may be communicated via a logical link control and adaptation protocol (L2CAP) channel, which is layered over logical links and logical transports, which are in turn constructed on physical links, physical channels and physical transports. The BR logical transports include the Synchronous Connection-Oriented (SCO), extended SCO (eSCO), Asynchronous Connection-Oriented (ACL), Active Slave Broadcast (ASB) and Connectionless Slave Broadcast (CSB) logical transports. Both the synchronous and the asynchronous logical transports may represent point-to-point links between a master STA 102 and a respective slave STA 102. The master STA 102 maintains the synchronous logical transports using reserved time slots at regular intervals to transmit SCO and eSCO packets. The master STA 102 can establish an ACL logic transport on a per-slot basis to transmit ACL packets to any slave STA 102 in the time slots not reserved for SCO and eSCO packets.

The BR PHY supports a BR mode having a bit rate of 1 Mbps, and an EDR mode having a bit rate of 2 or 3 Mbps. Each BR packet (PDU) generally includes three portions: an access code, a header and a payload (which may have zero length). The access code includes a preamble used for DC offset compensation, a sync word used for timing acquisition and synchronization, and optionally a trailer. The access code is also used for identification purposes as all packets transmitted in a single physical channel share the same access code. The packet header includes the link control information including a logical transport address and a packet type identification. In master-to-slave transmissions, the logical transport address indicates the destination slave STA 102 (or multiple slaves in the case of multicast or broadcast transmissions) intended to receive the packet, while in slave-to-master transmissions, the logical transport address indicates the source STA 102 transmitting the packet.

The Bluetooth LE core configuration is particularly designed to enable STAs 102 having relatively lower current consumption, complexity and cost than BR- or EDR-supporting STAs 102. For example, Bluetooth LE may be especially advantageous for use cases and applications requiring lower data rates and duty cycles. LE STAs 102 may support at least three PHY modes ("PHYs"): LE 1M, LE 2M and LE Coded, supporting bit rates of 1 megabit per second (Mbps), 2 Mbps, and either 125 kilobits per second (kpbs) or 500 kpbs (depending on the coding), respectively. LE supports both frequency division multiple access (FDMA) and time division multiple access (TDMA) schemes. Forty physical channels separated by 2 MHz may be used in the FDMA scheme. For TDMA, a polling scheme may be used in which one device transmits at a predetermined time and a corresponding device responds after a predetermined time interval. The LE logical transports include the LE asynchronous connection (LE ACL), LE Advertising Broadcast (ADVB) and LE Periodic Advertising Broadcast (PADVB) logical transports.

Figure 2A:
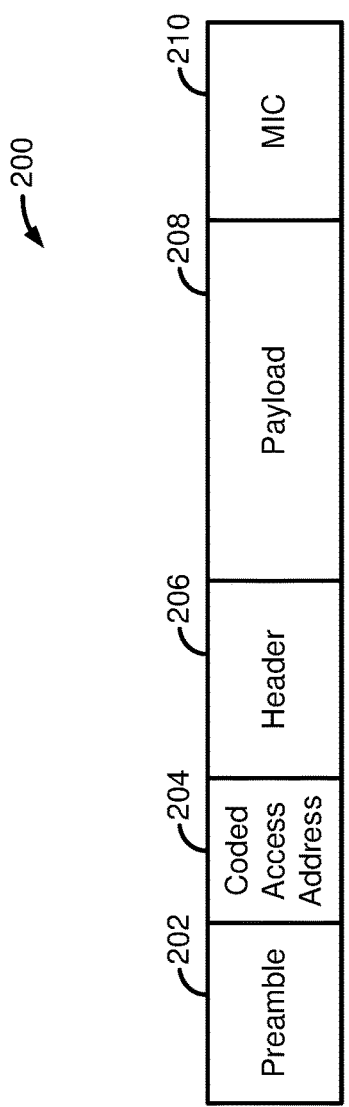
FIG. 2A shows an example protocol data unit (PDU) configured for transmission on one or more physical channels.

FIG. 2A shows an example PDU 200 configured for transmission on one or more Bluetooth LE physical channels. For example, the PDU 200 can be configured for transmission via advertising, periodic, data or isochronous channels. The PDU 200 may include numerous fields including, a PHY preamble 202, an access address 204 (including a physical channel access code), a PHY header 206 (including the logical transport and logical link identifiers), a payload 208, and, optionally, a message integrity check (MIC) 202 (for authenticating the data in the payload).

Figure 2B:
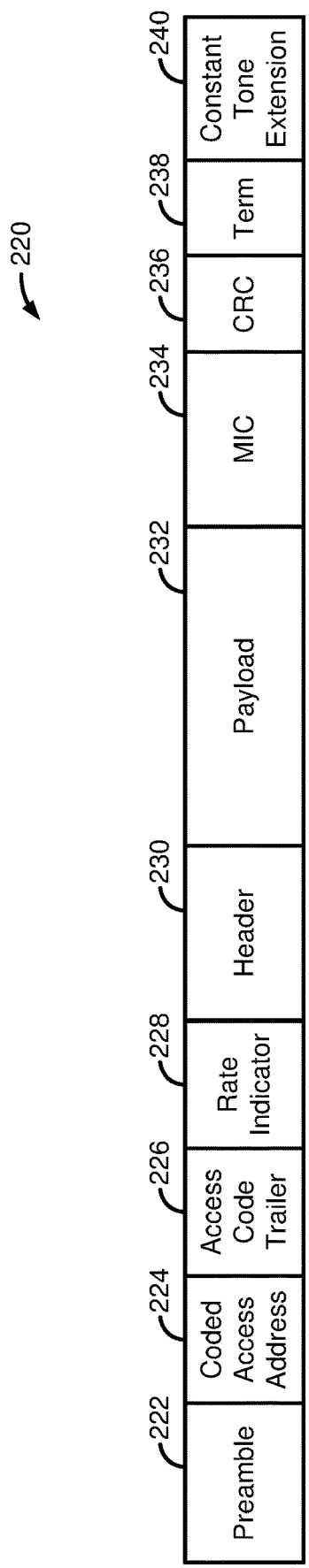
FIG. 2B shows an example PDU configured for transmission on one or more physical channels according to some implementations.

FIG. 2B shows an example PDU 220 configured for transmission on one or more physical channels according to some implementations. For example, the PDU 220 also can be configured for transmission via advertising, periodic, data or isochronous channels. The PDU 220 may include numerous physical layer fields including, for example, a PHY preamble 222, a coded access address 224 (including a physical channel access code), an optional access code trailer 226, a rate indicator 228, a PHY header 230 (including the logical transport and logical link identifiers), a payload 232, and, optionally, one, some or all of a MIC 234 (for authenticating the data in the payload), a cyclic redundancy check (CRC) 236, a termination (TERM) 238, or a constant tone extension 216 (including direction finding information).

The rate indicator 228 enables the transmitting device to dynamically change the modulation, and thus the data rate of the packet, by indicating a modulation used to modulate the subsequent header 230 and the payload 232 (the MIC 234, CRC 236 and TERM 238 may also be modulated using the same modulation as the header and the payload). The rate indicator 208 may indicate one of multiple possible modulation and coding scheme modes. For example, the rate indicator 208 may indicate one of the LE 1M, LE 2M and LE Coded modes described above. Additionally or alternatively, in some implementations the rate indicator 208 may indicate one or more of a π/4-Quadrature Phase Shift Keying (QPSK) with 1/2 coding mode (having an associated data rate of 2 Mbps), a π/14-QPSK with 3/4 coding mode (having an associated data rate of 3 Mbps), a π/4-Differential QPSK (DQPSK) with no coding mode (having an associated data rate of 4 Mbps), an 8 Phase Shift Keying (8PSK) with 5/6 coding mode (having an associated data rate of 5 Mbps), or a Differential 8PSK (D8PSK) with no coding mode (having an associated data rate of 6 Mbps).

In the Bluetooth LE core configuration, several types of physical channels are defined including the advertising, periodic, data and isochronous channels referenced above. The physical channels are divided into time units referred to as events during which STAs 102 may communicate with one another. These events may in turn be sub-divided into sub-events (also referred to herein simply as "events"). For example, such events may include advertising events, connection events and isochronous events. STAs 102 transmit particular types of packets associated with particular types of events on particular physical channels. For example, each connection event is initiated by a master STA 102 via a connection creation procedure. Frequency channel hopping can occur at the start of each connection event. Connection events may be used to transmit asynchronous data PDUs ("data packets") between STAs 102 via the data channels.

Figure 3:
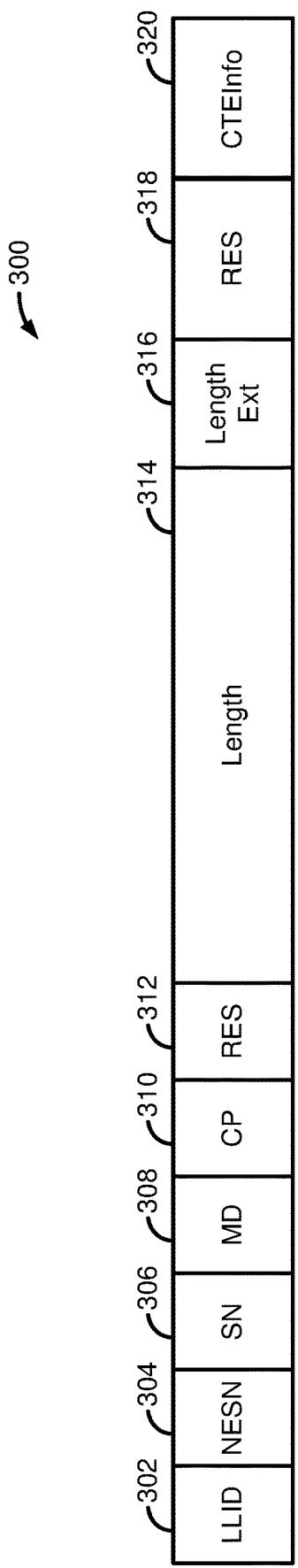
FIG. 3 shows an example data packet header 300 configured for transmission on a data channel.

FIG. 3 shows an example data packet header 300 configured for transmission on a data channel. For example, the data packet header 300 can be an example of the header 206 in the PDU 200 or the header 230 in the PDU 220, described with reference to FIGS. 2A and 2B, respectively, when configured for transmission on the data channel. The data packet header 300 may include numerous fields including, for example, a logical link identifier (LLID) 302, a next expected sequence number (NESN) 304, a sequence number (SN) 306, a more data (MD) indication 308, a cyclic prefix (CP) 310, a reserved field (RES) 312, and a length 314 (indicating the length of the associated PDU payload). In some implementations described herein, the data packet header 300 further includes a length extension (LengthExt) 316 (enabling the transmission of larger PDU payloads by indicating a larger, extended length of the associated PDU payload), and, optionally, a second RES 318 or a constant tone extension (CTE) information field (CTEInfo) 320.

Advertising events may be used to transmit advertising channel PDUs ("advertising packets") via one or more advertising channels to establish pair-wise bidirectional communications via data channels, periodic broadcasts via secondary advertising channels, or isochronous broadcasts via isochronous channels. For example, if an advertising device ("advertiser") is using a connectable advertising event, the initiating device ("initiator") may make a connection request using the same advertising channel on which it received the advertising packet. If the advertiser receives and accepts the connection request, a connection is established and the initiator becomes the master device while the advertiser becomes a slave device. For example, ADV_EXT_IND and ADV_AUX_IND PDUs ("packets") may be transmitted during extended advertising events for scanning purposes or to initiate other devices, while AUX_SYNC_IND PDUs ("packets") may be transmitted during periodic advertising events also for scanning purposes.

Figure 4:
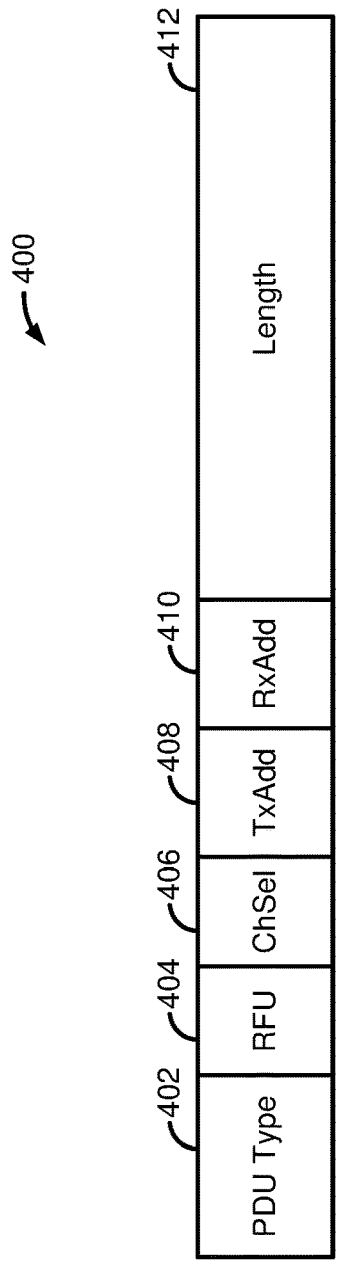
FIG. 4 shows an example advertising packet header 400 configured for transmission on an advertising channel.

FIG. 4 shows an example advertising packet header 400 configured for transmission on an advertising channel. For example, the advertising packet header 400 can be an example of the header 206 in the PDU 200 or the header 230 in the PDU 220, described with reference to FIGS. 2A and 2B, respectively, when configured for transmission on the advertising channel. The advertising packet header 400 may include numerous fields including, for example, a PDU type 402, a RES 404, a channel selection field (ChSel) 406, an address of the advertising (transmitting) device (TxAdd) 408, an address of the target recipient device (RxAdd) 410, and a length 412 (indicating the length of the associated PDU payload).

Isochronous events may be used to transmit isochronous PDUs ("isochronous packets") between STAs 102 via isochronous channels. The LE isochronous physical channel is characterized by a pseudo-random sequence of PHY channels and by additional synchronization parameters provided by the transmitting STA 102, whether it be the master device in a connected configuration or whether it be a broadcasting device in a connectionless configuration. These synchronization parameters include a channel map that indicates the set of channels used in the piconet, a pseudo random number used as an index into the complete set of channels, and the timing of the first data packet.

Isochronous data transfer combines features of both synchronous and asynchronous data transfer. For example, in an isochronous data transfer system, each transmission begins with a start packet. Blocks of data are then transmitted asynchronously. Typically, the data must be transmitted with a guaranteed bandwidth to ensure delivery within specified time constraints. As such, isochronous data transfer may be advantageous in applications including voice traffic, streaming video, and streaming audio (for example, between a mobile smartphone and wireless earbuds).

There are two general categories of isochronous communications, those between connected STAs 102 and those between unconnected STAs 102. During an isochronous event exchange between connected STAs 102, a master STA 102 and a slave STA 102 may communicate over a point-to-point logical transport called a Connected Isochronous Stream (CIS) to exchange isochronous data in a unidirectional or bidirectional manner. The master and slave STAs 102 may form a Connected Isochronous Group (CIG) including one or more time-related CISs. A CIS is defined by multiple events and subevents that occur at regular intervals including, for example, subevents for transmission and reception of isochronous data. The master STA 102 may advertise the CIG, and once a connection is established with a slave STA 102, may use an LE ACL channel to set up the logical channels for one or more associated CISs.

Figure 5:
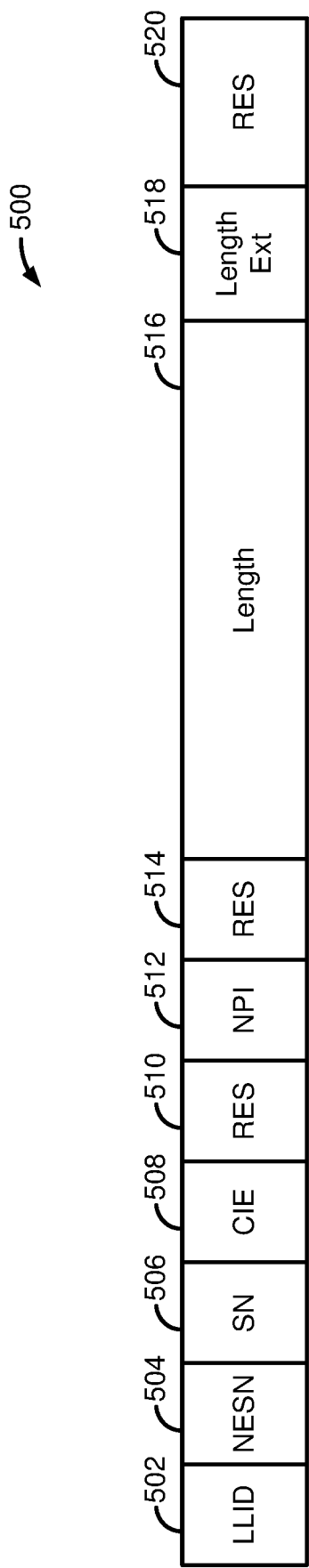
FIG. 5 shows an example Connected Isochronous Stream (CIS) packet header configured for transmission on an isochronous channel.

FIG. 5 shows an example CIS packet header 500 configured for transmission on an isochronous channel. For example, the CIS packet header 500 can be an example of the header 206 in the PDU 200 or the header 230 in the PDU 220, described with reference to FIGS. 2A and 2B, respectively, when configured for transmission on the isochronous channel. The CIS packet header 500 may include numerous fields including, for example, an LLID 502, an NESN 504, an SN 506, a close isochronous event field (CIE) 508, a first RES 510, a null PDU indicator (NPI) 512, a second RES 514, and a length 516 (indicating the length of the associated PDU payload). In some implementations described herein, the CIS packet header 500 further includes a LengthExt 518 (enabling the transmission of larger PDU payloads by indicating a larger, extended length of the associated PDU payload), and optionally a third RES 520.

Figure 6:
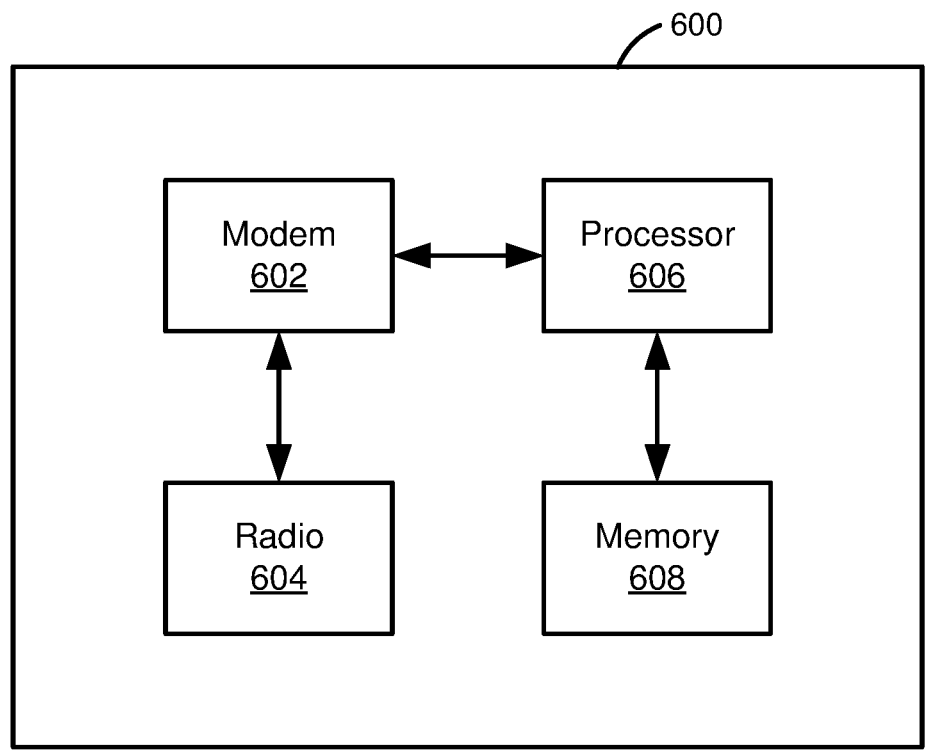
FIG. 6 shows a block diagram of an example wireless communication device.

FIG. 6 shows a block diagram of an example wireless communication device 600. In some implementations, the wireless communication device 600 can be an example of a device for use in a STA such as one of the STAs 102 described above with reference to FIG. 1. The wireless communication device 600 is capable of transmitting (or outputting for transmission) and receiving wireless communications (for example, in the form of wireless packets). For example, the wireless communication device can be configured to transmit and receive packets in the form of protocol data units (PDUs) conforming to an IEEE 802.15 standard or one or more of the Bluetooth® standards defined by the Bluetooth SIG. The wireless communication device 600 can be, or can include, a chip, system on chip (SoC), chipset, package or device that includes one or more modems 602, for example, a Bluetooth-compliant modem. In some implementations, the one or more modems 602 (collectively "the modem 602") additionally include a WLAN modem (for example, an IEEE 802.11-compliant modem). In some implementations, the wireless communication device 600 also includes one or more radios 604 (collectively "the radio 604"). In some implementations, the wireless communication device 600 further includes one or more processors, processing blocks or processing elements 606 (collectively "the processor 606") and one or more memory blocks or elements 608 (collectively "the memory 608").

The modem 602 is generally configured to implement a PHY layer. For example, the modem 602 is configured to modulate packets and to output the modulated packets to the radio 604 for transmission over the wireless medium. The modem 602 is similarly configured to obtain modulated packets received by the radio 604 and to demodulate the packets to provide demodulated packets. In addition to a modulator and a demodulator, the modem 602 may further include digital signal processing (DSP) circuitry, automatic gain control (AGC), a coder, a decoder, a multiplexer and a demultiplexer.

The radio 604 generally includes at least one radio frequency (RF) transmitter (or "transmitter chain") and at least one RF receiver (or "receiver chain"), which may be combined into one or more transceivers. For example, the RF transmitters and receivers may include various DSP circuitry including at least one power amplifier (PA) and at least one low-noise amplifier (LNA), respectively. The RF transmitters and receivers may in turn be coupled to one or more antennas. The symbols output from the modem 602 are provided to the radio 604, which then transmits the symbols via the coupled antennas. Similarly, symbols received via the antennas are obtained by the radio 604, which then provides the symbols to the modem 602.

The processor 606 can include an intelligent hardware block or device such as, for example, a processing core, a processing block, a central processing unit (CPU), a microprocessor, a microcontroller, a digital signal processor (DSP), an application-specific integrated circuit (ASIC), a programmable logic device (PLD) such as a field programmable gate array (FPGA), discrete gate or transistor logic, discrete hardware components, or any combination thereof designed to perform the functions described herein. The processor 606 processes information received through the radio 604 and the modem 602, and processes information to be output through the modem 602 and the radio 604 for transmission through the wireless medium. For example, the processor 606 may implement a media access control (MAC) layer configured to perform various operations related to the generation and transmission of frames, PDUs or packets. The MAC layer is configured to perform or facilitate the coding and decoding of frames, and resource allocation, among other operations or techniques. In some implementations, the processor 606 may generally control the modem 602 to cause the modem to perform various operations described above.

The memory 604 can include tangible storage media such as random access memory (RAM) or read-only memory (ROM), or combinations thereof. The memory 604 also can store non-transitory processor- or computer-executable software (SW) code containing instructions that, when executed by the processor 606, cause the processor to perform various operations described herein for wireless communication, including the generation, transmission, reception and interpretation of MPDUs, frames or packets. For example, various functions of components disclosed herein, or various blocks or steps of a method, operation, process or algorithm disclosed herein, can be implemented as one or more modules of one or more computer programs.

Figure 7:
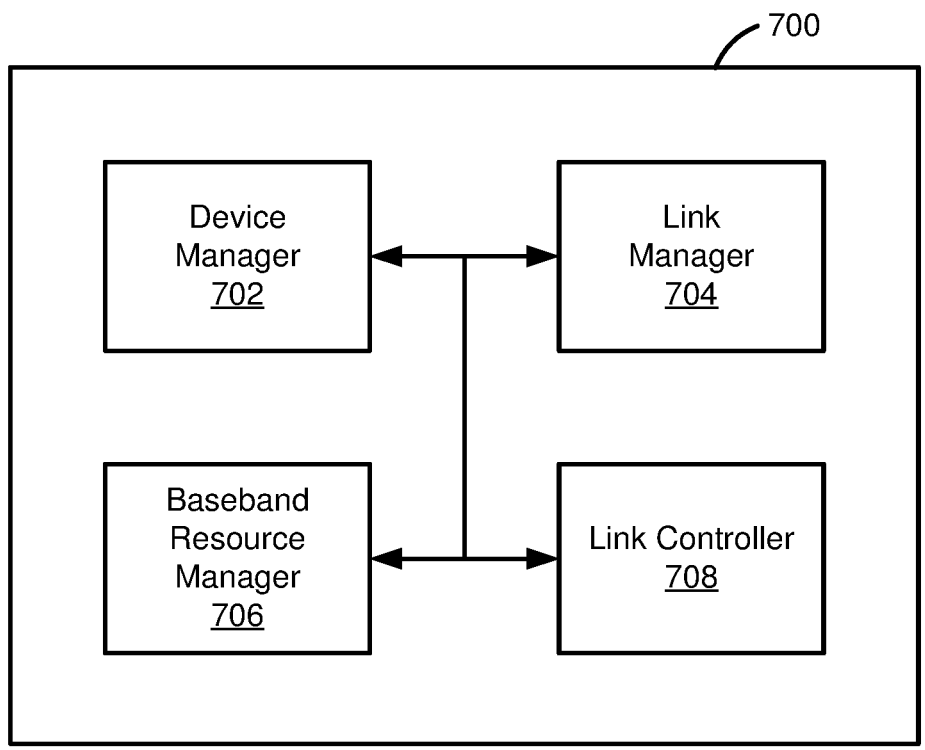
FIG. 7 shows a block diagram of an example media access control (MAC) layer.

FIG. 7 shows a block diagram of an example MAC layer 700. For example, the MAC layer 700 may be an example of a MAC layer implemented by the processor 606 described with reference to FIG. 6. In the illustrated implementation, the MAC layer 700 includes a device manager 702, a link manager 704, a baseband resource manager 706 and a link controller 708. The device manager 702 controls the general behavior of the Bluetooth system and is responsible for discovery and for connecting to other Bluetooth devices, and generally all operations not directly related to data transport. The link manager 704 manages the creation, modification and termination of logical links (including the associated logical transports) as well as the updating of parameters related to the physical links. The baseband resource manager 706 manages access to the wireless medium and is configured to perform scheduling and to enforce QoS requirements. The link controller 708 manages the encoding and decoding of packets.

Figure 8:
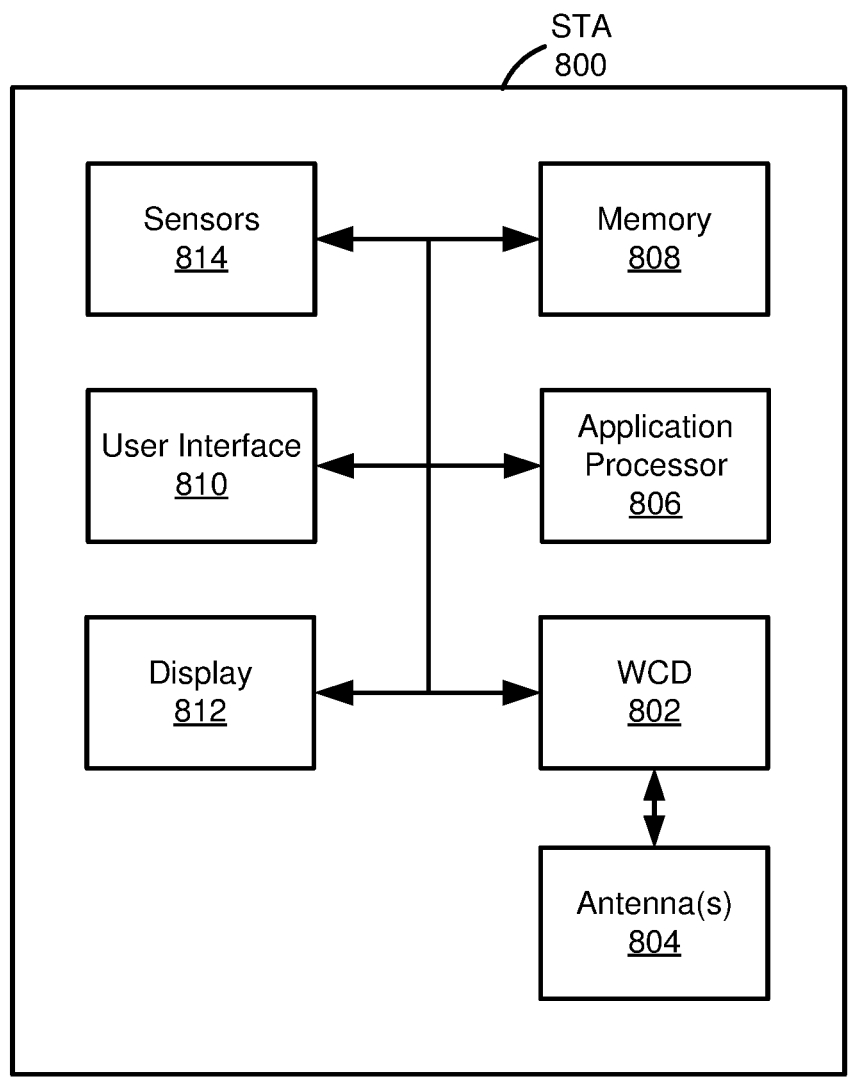
FIG. 8 shows a block diagram of an example station (STA).

FIG. 8 shows a block diagram of an example STA 800. For example, the STA 800 can be an example implementation of the STA 102 described with reference to FIG. 1. The STA 800 includes a wireless communication device 802. For example, the wireless communication device 802 may be an example implementation of the wireless communication device 600 described with reference to FIG. 6. The STA 800 also includes one or more antennas 804 coupled with the wireless communication device 802 to transmit and receive wireless communications. The STA 800 additionally includes an application processor 806 coupled with the wireless communication device 802, and a memory 808 coupled with the application processor 806. In some implementations, the STA 800 further includes a user interface (UI) 810 (such as a touchscreen or keypad) and a display 812, which may be integrated with the UI 810 to form a touchscreen display. In some implementations, the STA 800 may further include one or more sensors 814 such as, for example, one or more inertial sensors, accelerometers, temperature sensors, pressure sensors, or altitude sensors. Ones of the aforementioned components can communicate with other ones of the components directly or indirectly, over at least one bus.

In some examples, a Bluetooth-compliant STA 800 also may be configured for wireless communication with other networks such as with a Wi-Fi WLAN or a WWAN (for example, a cellular network such as an LTE, 4G or 5G network), which may, in turn, provide access to external networks including the Internet. As such, and as used herein, a wireless communication device, such as one of the devices 102, 600, or 802 described with reference to FIGS. 1, 6 and 8, respectively, may refer to a device that is capable of operating within both a Bluetooth network as well as another type of wireless network, such as a Wi-Fi BSS or within a WWAN cell. To manage coexistence between Bluetooth and WLAN systems, which both operate in the ISM 2.4 GHz band, the use of the shared wireless medium may be time-division multiplexed to ensure that only one of the interfering modems will gain access to the physical wireless medium at any given time. Adaptive frequency hopping also improves coexistence with co-located static (non-hopping) systems.

As described above, FIGS. 2A and 2B show examples of PDUs 200 and 220, respectively, configured for transmission on one or more physical channels. The use of the PDU 200 does not permit the transmitting device to dynamically change the modulation scheme, and thus the data rate, of the payload 208 without first terminating the wireless link between the transmitting and receiving devices and subsequently reestablishing the wireless link with the new modulation scheme. Similarly, the use of the PDU 200 does not enable the transmitting device to dynamically change the set of stream parameters (or "configuration settings") without first terminating the wireless link and subsequently reestablishing the wireless link with the new stream parameters. The inability to dynamically switch the modulation scheme and stream parameters results in unnecessary latency due to the time required to terminate and reestablish the link. As a result of the time penalty involved with changing the modulation scheme and stream parameters, it is typically the case that a relatively conservative modulation scheme and corresponding set of stream parameters are selected to provide for increased sensitivity to guarantee reliability even when it is not necessary. The use of a conservative modulation scheme may necessitate additional time resources when transmitting longer packets, thus reducing the throughput.

In contrast to the PDU 200, the PDU 220 includes a physical layer rate indicator 228 that enables the transmitting device to dynamically indicate the modulation, and thus the data rate, of the payload 232 of the PDU 220. The rate indicator 228 thus enables the transmitting device to change the modulation scheme on the fly, potentially on a per packet basis, without terminating the connection. However, even if the modulation scheme can be changed dynamically, the particular configuration of the link, including the stream parameters for the associated channel, used for one modulation scheme are generally not optimal for a different modulation scheme.

Various implementations relate generally to techniques for signaling modulation schemes and stream parameters such that the modulation schemes and the stream parameters can be adapted dynamically while maintaining an existing wireless connection. Some implementations more specifically relate to signaling, via a first channel, a set of stream parameters (also referred to as "channel parameters" or "configuration settings") that govern communications on a second channel when a particular modulation scheme is used to modulate the packets transmitted via the second channel. In some implementations, a transmitting device selects a respective set of stream parameters for each of multiple modulation schemes. For example, in addition to a default, initial or baseline modulation scheme and set of corresponding stream parameters, the transmitting device can select alternative modulation schemes and corresponding sets of stream parameters that are optimized for the respective modulation schemes, for example, to achieve an advantageous combination of throughput, latency and reliability. In some implementations, the transmitting device signals the modulation schemes and the respective sets of stream parameters to be used with the modulation schemes via the first channel (for example, a control channel) in advance of switching modulation schemes for the second channel (for example, a channel that carries data). The transmitting device is enabled to change the modulation scheme and the corresponding set of stream parameters for the second channel on the fly, and while maintaining the connection, by including an indication of the new modulation scheme in the header of the next packet it transmits via the second channel that is modulated based on the new modulation scheme. For example, the transmitting device may monitor the link quality associated with the second channel and determine that it would be advantageous to switch modulation schemes as channel conditions change, for example, to switch to a higher data rate to provide increased throughput when channel conditions permit, or to switch to a lower data rate to achieve more sensitivity and reliability (for example, if interference is problematic or the receiving device is moving away from the transmitting device). Based on reading the header and identifying the modulation scheme, the receiving device can then identify the corresponding set of stream parameters based on the earlier signaling. In some implementations, the transmitting and receiving devices maintain respective tables mapping the modulation schemes to the respective sets of stream parameters.

Particular implementations of the subject matter described in this disclosure can be implemented to realize one or more of the following potential advantages. As described above, the described techniques can be used to dynamically switch modulation schemes as channel conditions change while maintaining a connection, for example, to switch to a higher data rate to provide increased throughput, or to switch to a lower data rate to achieve more sensitivity and reliability. Furthermore, the described techniques also enable the dynamic switching of corresponding sets of stream parameters that are optimized for the respective modulation schemes, for example, to achieve an advantageous combination of throughput, latency and reliability. Additionally, some implementations provide improved coexistence with other radio access technologies, such as Wi-Fi, because the transmitting device may increase the modulation scheme, and thus the data rate, for communications on the second channel, thereby reducing or minimizing the time, frequency or antenna resources necessary for the second channel and enabling more resources to be dedicated to the other radio access technologies. Additionally, some implementations permit the use of a new extended length packet permitting more data to be carried by each packet, which, when combined with a higher data rate, increases the throughput of the system.

Figure 9:
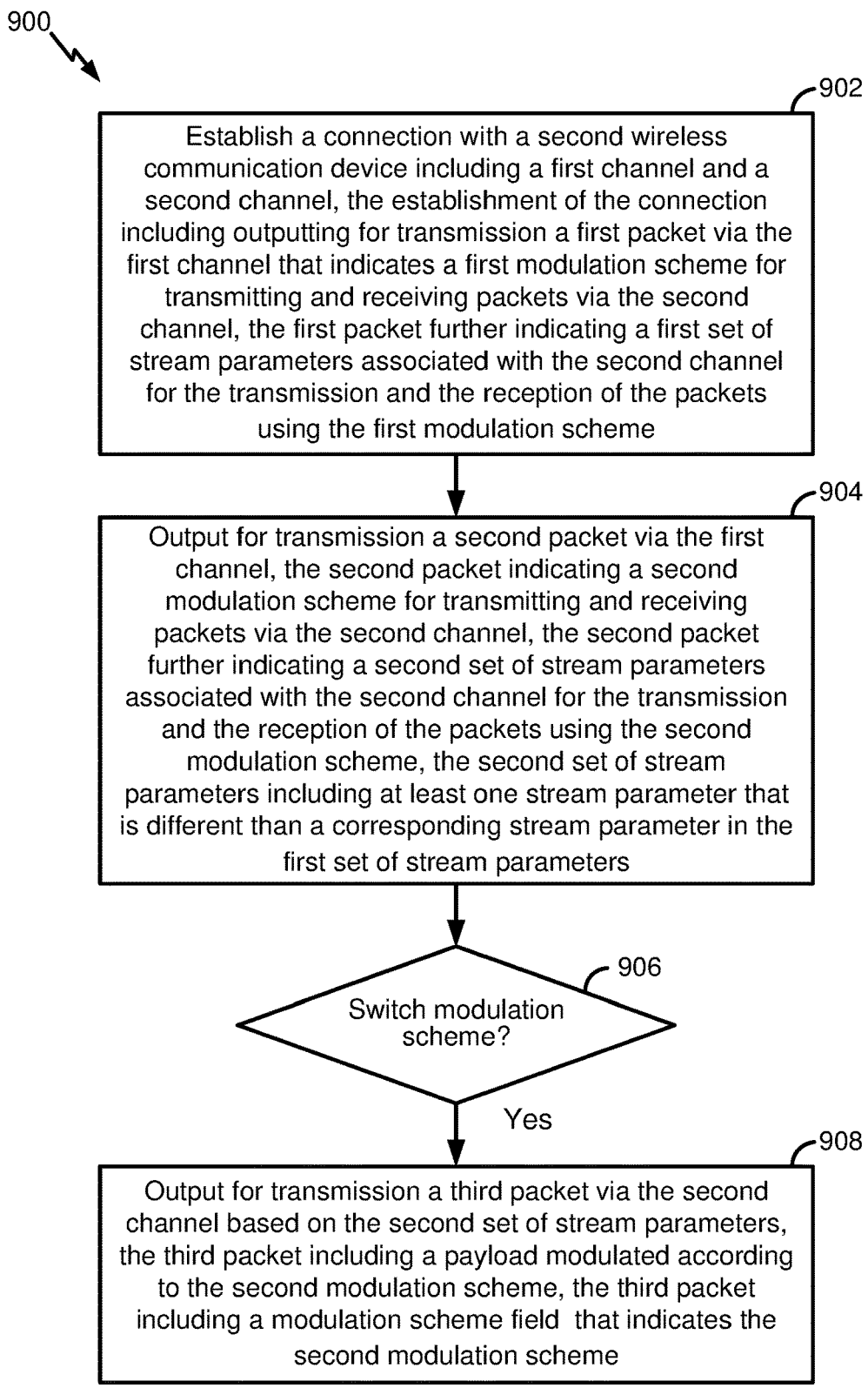
FIG. 9 shows a flowchart illustrating an example process for wireless communication according to some implementations.

FIG. 9 shows a flowchart illustrating an example process 900 for wireless communication according to some implementations. For example, the process 900 can be used to signal a modulation scheme and a corresponding set of stream parameters associated with data communications. In some implementations, the process 900 may be performed by a first wireless communication device such as the wireless communication device 600 described above with reference to FIG. 6. In some such implementations, the process 900 may be performed by a wireless communication device operating within a STA, such as one of the STAs 102 or 800 described above with reference to FIGS. 1 and 8, respectively. In some implementations, the process 900 may be performed at least in part by a MAC layer, such as the MAC layer 700 described with reference to FIG. 7.

Figure 10:
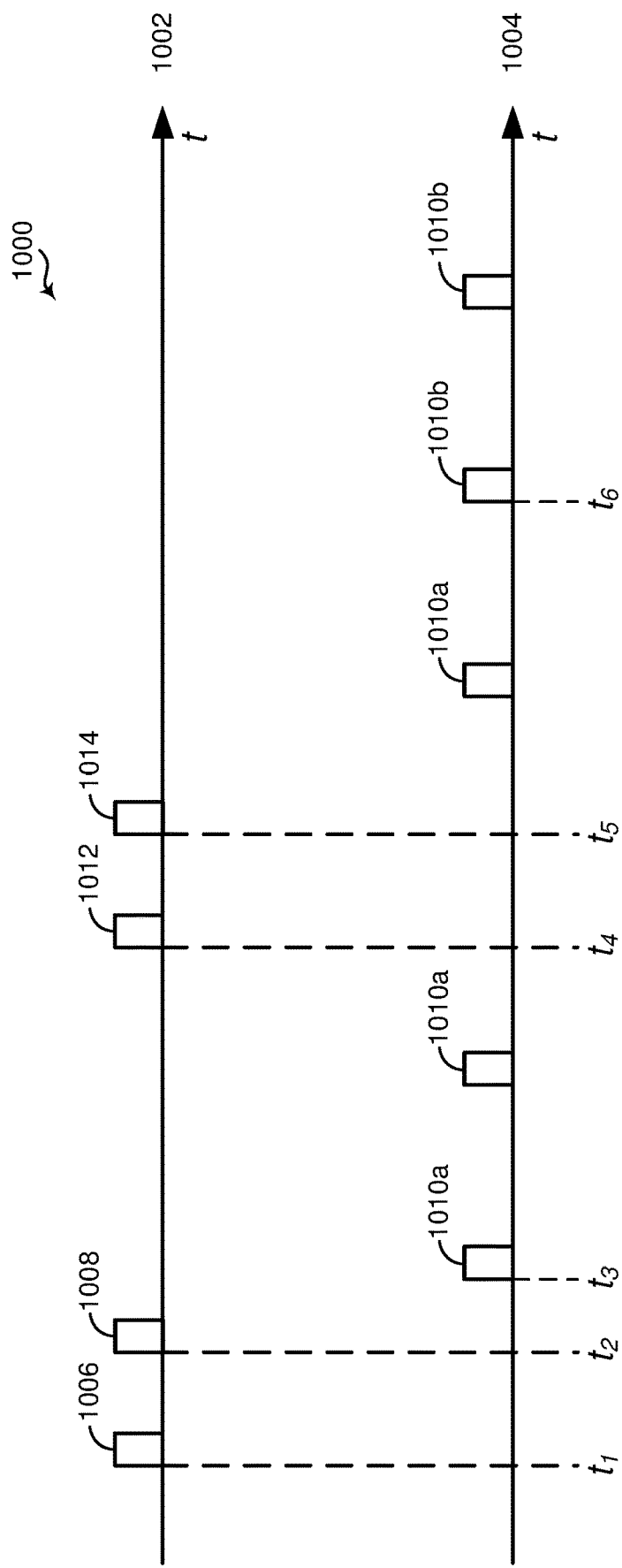
FIG. 10 shows a timing diagram illustrating the transmission of packets on two different physical channels according to some examples of the process described with reference to FIG. 9.

The process 900 begins in block 902 with establishing a connection with a second wireless communication device including a first channel and a second channel. For example, the first channel may serve as a control channel governing communications on the second channel, which may serve as a data channel. In some implementations, the first wireless communication device may be a master device relative to the second wireless communication device (which may be a slave device relative to the first wireless communication device). In some implementations, the establishment of the connection includes outputting for transmission a first packet via the first channel that indicates a first modulation scheme for transmitting and receiving packets via the second channel. The first packet further indicates a first set of stream parameters (also referred to as "channel parameters" or "configuration settings") associated with the second channel for the transmission and the reception of the packets using the first modulation scheme. FIG. 10 shows a timing diagram 1000 illustrating the transmission of packets on two different physical channels according to some examples of the process 900. As shown in FIG. 10, the first communication device may transmit the first packet 1006 in block 902 via the first channel 1002 at time $t_1$.

In some implementations, the connection includes an Asynchronous Connection-Oriented (ACL) link, and the first channel is a physical layer channel associated with the ACL link. In some implementations, the connection includes a Bluetooth LE Connected Isochronous Stream (CIS) link, and the second channel is a physical layer channel associated with the CIS link. In some other implementations, the connection includes an Enhanced Synchronous Connection Oriented (SCO) (E-SCO) link, and the second channel is a physical layer associated with the E-SCO link.

In some implementations, the first modulation scheme may be selected from multiple possible modulation and coding scheme modes including, for example, one of the LE 1M, LE 2M, LE Coded, π/4-QPSK with 1/2 coding, π/14-QPSK with 3/4 coding, π/14-DQPSK with no coding, 8PSK with 5/6 coding, or the D8PSK with no coding modes. In some implementations, the first modulation scheme may be an initial or default modulation scheme that is associated with less aggressive modulation, more reliability, greater sensitivity and a relatively low data rate. Similarly, the first set of stream parameters may be a relatively conservative set of stream parameters, for example, stream parameters that may be optimized for or otherwise suitable for the relatively low data rate associated with the first modulation scheme.

Figure 11A:
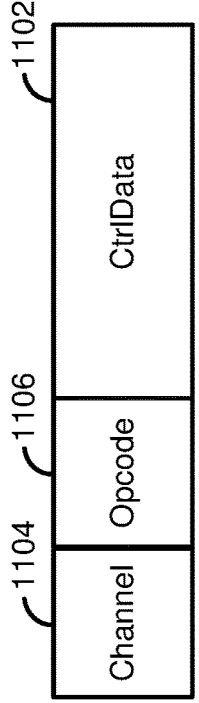
FIG. 11A shows an example payload of a control PDU according to some implementations.

In some implementations, the first packet is transmitted in the form of a control PDU ("control packet") that includes a modulation scheme field indicating the first modulation scheme and a stream parameters field indicating the first set of stream parameters. FIG. 11A shows an example payload 1100 of a control PDU according to some implementations. The control PDU may be an example of the PDU 200 described with reference to FIG. 2A, and the payload 1100 may be an example of the payload 208 in the PDU 200. The payload 1100 may include one or more fields including a control data (CtrlData) field 1102 and, in some implementations, a channel field 1104 and an opcode field 1106. The channel field 1104 may indicate a channel for various control PDUs. The opcode field 1106 may include opcode for the various control PDUs.

Figure 11B:
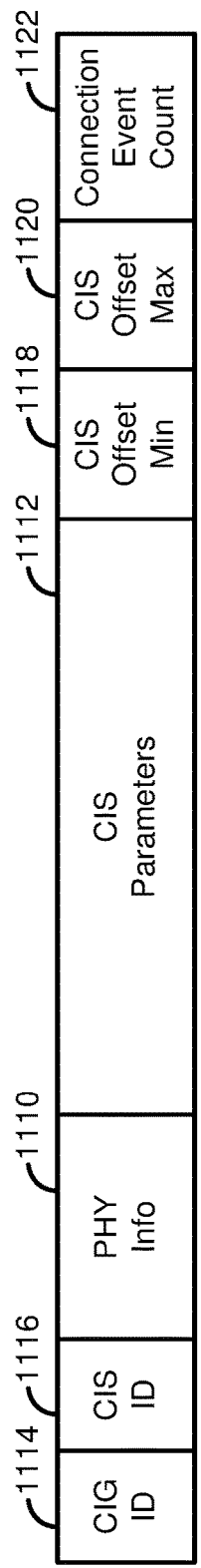
FIG. 11B shows an example control data field according to some implementations.

The control data field 1102 includes information indicating a modulation scheme for the second channel and a set of stream parameters to be used with the modulation scheme. FIG. 11B shows an example control data field 1102 according to some implementations. In the illustrated example, the modulation scheme and the set of stream parameters are associated with a CIS. The control data field 1102 may include numerous fields including, for example, a PHY information (PHY Info) field 1110 (an example of a modulation scheme field) that indicates the modulation scheme to be used with the second channel. The control data field 1102 also includes a stream parameters field (for example, a CIS parameters field) 1112. In the context of the first packet, the PHY Info field 1110 indicates the first modulation scheme and the CIS parameters field 1112 indicates the first set of stream parameters. The control data field may further include one, some or all of a CIG identifier (CIG ID) 1114, a CIS identifier (CIS ID) 1116, a CIS Offset Minimum 1118, a CIS Offset Maximum 1120, or a connection event count 1122.

Figure 11C:
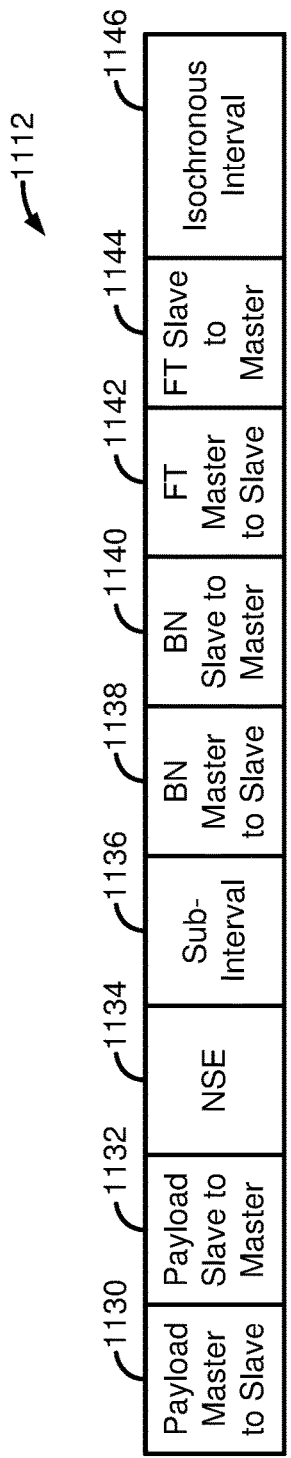
FIG. 11C shows an example stream parameters field according to some implementations.

FIG. 11C shows an example stream (for example, CIS) parameters field 1112 according to some implementations. Again, in the illustrated example, the stream parameters include or consist of CIS parameters. The CIS parameters field 1112 may include numerous stream parameters in numerous respective fields including, for example, one, some or all of a Payload Master to Slave field 1130 indicating a maximum packet size for transmissions to the second wireless communication device, a Payload Slave to Master field 1132 indicating a maximum packet size for transmissions from the second wireless communication device, a number of subevents (NSE) field 1134 indicating a maximum number of subevents in each isochronous interval, a subevent interval (Sub-Interval) field 1136 indicating a subevent interval, a burst number (BN) Master to Slave field 1138 indicating a burst number to be used for transmissions to the second wireless communication device, a BN Slave to Master field 1140 indicating a burst number to be used for transmissions from the second wireless communication device, a flush timeout (FT) Master to Slave field 1142 indicating the number of CIS events that may be used to transmit or retransmit CIS data PDUs to the second wireless communication device, a FT Slave to Master field 1144 indicating the number of CIS events that may be used to transmit or retransmit CIS data PDUs to the first wireless communication device, or an Isochronous Interval field 1146 indicating the isochronous channel interval (the interval between isochronous events).

In some implementations, the first wireless communication device may receive a first response packet via the first channel from the second wireless communication device after transmitting the first packet in block 902. The first response packet may include an indication that the second wireless communication device supports the first modulation scheme and the first set of stream parameters. In some implementations, the first response packet is transmitted in the form of a control PDU that includes control data indicating that the second wireless communication device supports the first modulation scheme and the first set of streams parameters. For example, the control PDU may be an example of the PDU 200 described with reference to FIG. 2A, and may include a payload such as the payload 1100 described with reference to FIGS. 11A-11C. The payload 1100 may include one or more fields including a control data (CtrlData) field 1102 indicating the capability to use the first modulation scheme and the first set of stream parameters. As shown in FIG. 10, the first communication device may receive the first response packet 1008 via the first channel 1002 at time $t_2$.

In some implementations, after transmitting the first packet in block 902, the first wireless communication device may begin transmitting packets on the second channel that are modulated according to the first modulation scheme and transmitted based on the first set of stream parameters. As shown in FIG. 10, the first communication device may begin transmitting packets 1010a modulated according to the first modulation scheme and transmitted based on the first set of stream parameters on the second channel 1004 at time $t_3$. Each packet 1010a may be an example of the PDU 220 described with reference to FIG. 2B. As described with reference to FIG. 2B, each packet 1010a may include a rate indicator field that indicates the first modulation scheme used to modulate at least the payload. As described above, in implementations in which the second channel is a physical layer channel associated with a CIS link, the payload may be an isochronous payload carrying isochronous data. Additionally, as described with reference to FIG. 5, an isochronous header of each packet may include a length extension field enabling the transmission of a larger isochronous payload by indicating a larger, extended length of the payload.

Referring back to FIG. 9, in block 904, the process 900 proceeds with outputting for transmission a second packet via the first channel. The second packet may be transmitted any time after the first packet while the links associated with the first and the second channels are maintained. The second packet indicates a second modulation scheme for transmitting and receiving packets via the second channel. Similar to the first packet, the second packet further indicates a second set of stream parameters associated with the second channel for the transmission and the reception of the packets using the second modulation scheme. As shown in FIG. 10, the first communication device may transmit the second packet 1012 in block 904 via the first channel 1002 at time $t_4$ (as indicated above, times $t_3$ and $t_4$ may be separated by any time duration spanning the transmission of any number of packets 1010a).

The second packet may not indicate to the second wireless communication device that the second wireless communication device should take any actions with respect to the second channel. In other words, in some implementations, the second packet does not indicate to the second wireless communication device that it should begin demodulating packets subsequently received via the second channel based on the second modulation scheme. Similarly, in such implementations, the second packet does not indicate to the second wireless communication device that it should begin using the second set of stream parameters for communications via the second channel. Rather, the second packet serves to inform the second wireless communication device of a second modulation scheme that may be used by the first wireless communication device to modulate packets to be transmitted via the second channel, and to inform the second wireless communication device of the second set of stream parameters to be used in conjunction with the second modulation scheme. As described with reference to FIGS. 2B and 10, each packet 1010a or 1010b transmitted via the second channel may include a rate indicator field 228 that indicates the modulation scheme used to modulate the subsequent portions of the packet including the payload.

The second modulation scheme also may be selected out of the multiple possible modulation and coding scheme modes including, for example, another of the LE 1M, LE 2M, LE Coded, π/4-QPSK with 1/2 coding, π/14-QPSK with 3/4 coding, π/14-DQPSK with no coding, 8PSK with 5/6 coding, or the D8PSK with no coding modes. In some implementations, the second modulation scheme may be associated with more aggressive modulation and a higher data rate than the first modulation scheme. Similarly, the second set of stream parameters may be a relatively more liberal set of stream parameters, for example, stream parameters that may be optimized for or otherwise take advantage of the relatively higher data rate associated with the second modulation scheme. The second set of stream parameters includes at least one stream parameter that is different than a corresponding stream parameter in the first set of stream parameters, but may generally include multiple different stream parameters. In some implementations in which the second channel is associated with a CIS, the first set of stream parameters includes a first set of CIS parameters, and the second set of stream parameters includes a second set of CIS parameters, the second set of CIS parameters includes at least one CIS parameter that is different than a corresponding CIS parameter in the first set of CIS parameters.

Again, the second packet may be transmitted in the form of a control packet, which may be an example of the PDU 200 described with reference to FIG. 2A having a payload that may be an example of the payload 1100 described with reference to FIG. 11A. Similarly, the second packet includes a modulation scheme field indicating the second modulation scheme and a stream parameters field indicating the second set of stream parameters. For example, the payload of the second packet may include a control data field such as the CtrlData field 1102 described with reference to FIG. 11B. The control data field in the payload of the second packet may include the modulation scheme field, for example, in the form of a PHY information field such as the PHY Info field 1110 described with reference to FIG. 11C, which indicates the second modulation scheme to be used with the second channel. The control data field may also include the stream parameters field, for example, in the form of the CIS parameters field 1112 described with reference to FIG. 11C, which indicates the second set of stream parameters.

In some implementations, the first wireless communication device maintains a data structure, for example, in the form of a mapping table, that maps modulation schemes to corresponding sets of stream parameters. As such, the first wireless communication device may construct a mapping table that maps the first modulation scheme to the first set of stream parameters and that maps the second modulation scheme to the second set of stream parameters. Furthermore, the mapping table may map any number of additional modulation schemes to corresponding sets of stream parameters.

In some implementations, the first wireless communication device may receive a second response packet via the first channel from the second wireless communication device after transmitting the second packet in block 904. The second response packet may include an indication that the second wireless communication devices supports the second modulation scheme and the second set of stream parameters. For example, the second response packet may include control data indicating that the second wireless communication device supports the second modulation scheme and the second set of stream parameters. As shown in FIG. 10, the first communication device may receive the second response packet 1014 via the first channel 1002 at time $t_5$.

In some implementations, after transmitting the second packet in block 904, the first wireless communication device may continue to transmit packets via the second channel that are modulated according to the first modulation scheme and transmitted based on the first set of stream parameters. For example, as shown in FIG. 10, in some instances the first wireless communication device continues to transmit packets 1010a modulated according to the first modulation scheme and transmitted based on the first set of stream parameters via the second channel. Additionally or alternatively, after transmitting the second packet in block 904, the first wireless communication device may continue to receive packets from the second wireless communication device via the second channel that are modulated according to the first modulation scheme and transmitted based on the first set of stream parameters.

At some point in time, in block 906, the process 900 proceeds with determining whether to switch from the first modulation scheme to the second modulation scheme. The determination to switch modulation schemes may be made at any time while the links associated with the first and the second channels are maintained. In some implementations, the first wireless communication device is generally configured to determine whether to switch among two or more modulation schemes in block 906 based on channel conditions or various metrics on a periodic basis, such as once per event (for example, isochronous event) interval. In some other instances it may be advantageous to determine whether to switch on a different basis. In some implementations, the determination in block 906 of whether to switch from the first modulation scheme to the second modulation scheme (or generally from a current modulation scheme to another modulation scheme) is based on one or more of an estimated bit error rate (BER) associated with packets transmitted based on the first modulation scheme, an observed acknowledgment (ACK) rate associated with packets transmitted based on the first modulation scheme, or an observed negative acknowledgment (NACK) rate associated with packets transmitted based on the first modulation scheme. The determination in block 906 may further be based on estimated rates associated with packets to be transmitted based on the second modulation scheme or other modulation schemes, or based on past observed rates associated with packets transmitted based on the second modulation scheme or other modulation schemes.

If it is determined in block 906 to switch to the second modulation scheme, the process 900 proceeds in block 908 with outputting for transmission a packet including a payload modulated according to the second modulation scheme via the second channel based on the second set of stream parameters. The first wireless communication device transmits the packet while maintaining the links associated with the first and the second channels. In other words, the first and the second wireless communication devices maintain the connection between them including the first and the second channels while the first wireless communication device switches the modulation of the subsequent packets from the first modulation scheme to the second modulation scheme. As shown in FIG. 10, the first communication device may transmit the packet 1010b modulated according to the second modulation scheme and transmitted based on the second set of stream parameters on the second channel 1004 at time $t_6$ (for example, times $t_4$ and $t_6$ may be separated by any time duration spanning the transmission of any number of packets 1010a).

Each packet 1010b may also be an example of the PDU 220 described with reference to FIG. 2B. As described with reference to FIG. 2B, each packet 1010b may include a physical layer rate indicator field that indicates the second modulation scheme used to modulate at least the payload of the packet 1010b. As described above, in implementations in which the second channel is a physical layer channel associated with the CIS link, the payload may be an isochronous payload carrying isochronous data. Additionally, as described with reference to FIG. 5, an isochronous header of each packet may include a length extension field enabling the transmission of a larger isochronous payload by indicating a larger, extended length of the payload.

The modulation scheme indicated by, for example, the rate indicator field 228 in the packet 1010b not only informs the second wireless communication device about how to demodulate the subsequent portions of the packet, but also indicates to the second wireless communication device that the second set of stream parameters are now to be used for communication via the second channel. As shown in FIG. 10, the first wireless communication device may then continue to transmit or receive packets 1010b modulated according to the second modulation scheme and transmitted based on the second set of stream parameters unless, and until, the first wireless communication device again determines to switch the modulation scheme back to the first modulation scheme or to another modulation scheme.

Figure 12:
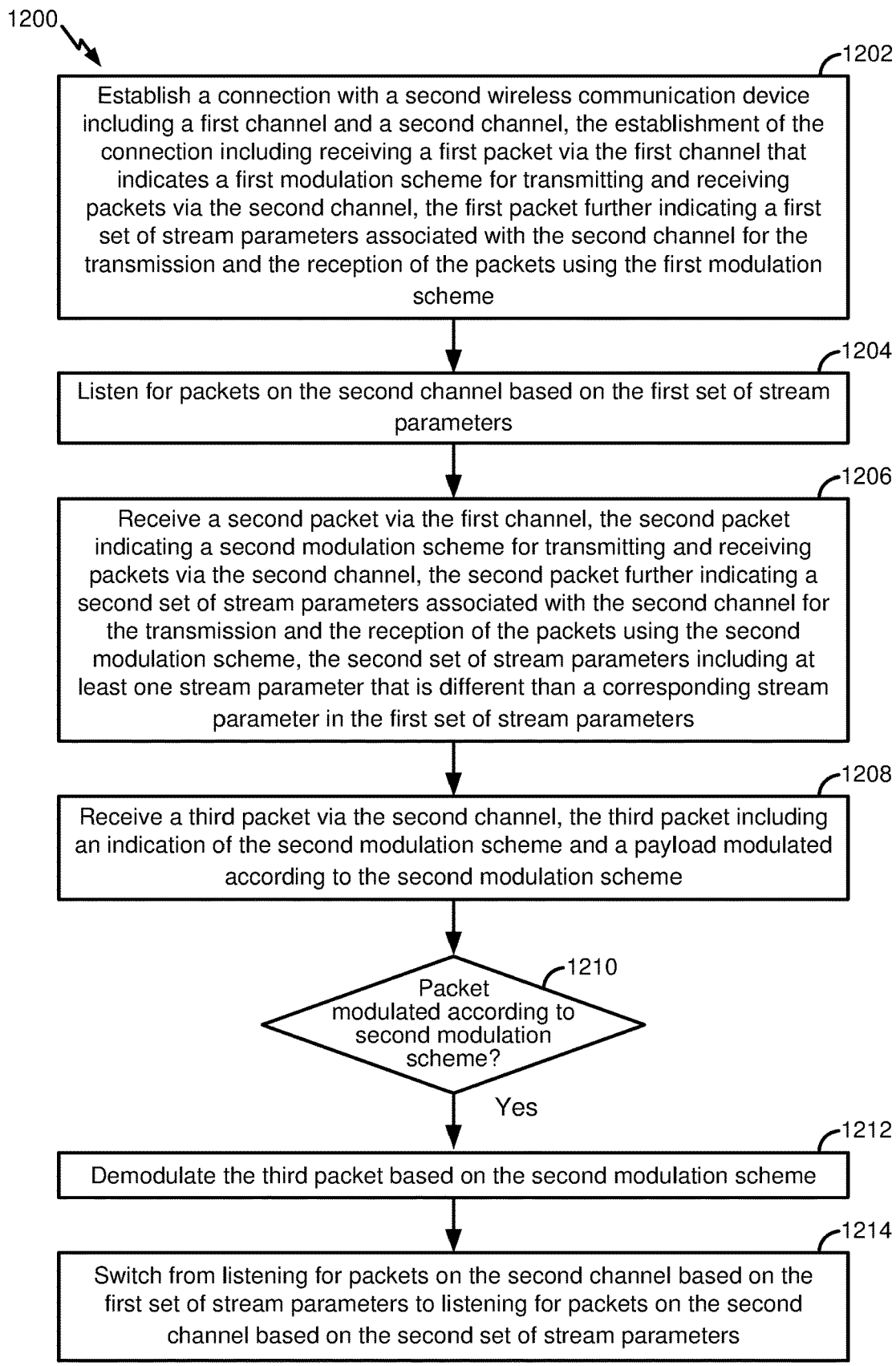
FIG. 12 shows a flowchart illustrating an example process for wireless communication according to some implementations.

FIG. 12 shows a flowchart illustrating an example process 1200 for wireless communication according to some implementations. For example, the process 1200 can be used to identify a modulation scheme and a corresponding set of stream parameters associated with data communications. In some implementations, the process 1200 may be performed by a first wireless communication device such as the wireless communication device 600 described above with reference to FIG. 6. In some such implementations, the process 1200 may be performed by a wireless communication device operating within a STA, such as one of the STAs 102 or 800 described above with reference to FIGS. 1 and 8, respectively. In some implementations, the process 1200 may be performed at least in part by a MAC layer, such as the MAC layer 700 described with reference to FIG. 7.

The process 1200 begins in block 1202 with establishing a connection with a second wireless communication device including a first channel and a second channel. In some implementations, the first wireless communication device may be a slave device relative to the second wireless communication device (which may be a master device relative to the first wireless communication device). In some implementations, the establishment of the connection includes receiving a first packet via the first channel that indicates a first modulation scheme for transmitting and receiving packets via the second channel. The first packet further indicates a first set of stream parameters associated with the second channel for the transmission and the reception of the packets using the first modulation scheme. As shown in FIG. 10, the first communication device may receive the first packet 1006 in block 1202 via the first channel 1002 at time $t_1$.

As described above with reference to FIG. 9, in some implementations, the connection includes an ACL link, and the first channel is a physical layer channel associated with the ACL link. Similarly, the connection can include a Bluetooth LE CIS link, and the second channel can be a physical layer channel associated with the CIS link. In some other implementations, the connection includes an E-SCO link, and the second channel is a physical layer associated with the E-SCO link. In some implementations, the first modulation scheme may be one of multiple possible modulation and coding scheme modes including, for example, one of the LE 1M, LE 2M, LE Coded, π/4-QPSK with 1/2 coding, π/14-QPSK with 3/4 coding, π/14-DQPSK with no coding, 8PSK with 5/6 coding, or the D8PSK with no coding modes.

In some implementations, the first packet may be received in the form of a control packet, which may be an example of the PDU 200 described with reference to FIG. 2A having a payload that may be an example of the payload 1100 described with reference to FIG. 11A. The first packet includes a modulation scheme field indicating the first modulation scheme and a stream parameters field indicating the first set of stream parameters. For example, the payload of the first packet may include a control data field such as the CtrlData field 1102 described with reference to FIG. 11B. The control data field in the payload of the first packet may include the modulation scheme field, for example, in the form of a PHY information field such as the PHY Info field 1110 described with reference to FIG. 11C, which indicates the first modulation scheme to be used with the second channel. The control data field may also include the stream parameters field, for example, in the form of the CIS parameters field 1112 described with reference to FIG. 11C, which indicates the first set of stream parameters.

In some implementations, after receiving the first packet in block 1202 and identifying the first modulation scheme and the first set of stream parameters, the first wireless communication device may generate or update a data structure, for example, in the form of a mapping table, that maps modulation schemes to corresponding sets of stream parameters. As such, the first wireless communication device may construct a mapping table that maps the first modulation scheme to the first set of stream parameters.

Although not shown in FIG. 12, in some implementations, the first wireless communication device may output for transmission a first response packet via the first channel to the second wireless communication device after receiving the first packet in block 1202. The first response packet may include an indication that the first wireless communication device supports the first modulation scheme and the first set of stream parameters. For example, the first response packet may include control data indicating that the first wireless communication device supports the first modulation scheme and the first set of stream parameters. As shown in FIG. 10, the first communication device may output the first response packet 1008 for transmission via the first channel 1002 at time $t_2$.

In some implementations, after receiving the first packet in block 1202 and identifying the first modulation scheme and the first set of stream parameters, the first wireless communication device may begin, in block 1204, listening for packets on the second channel based on the first set of stream parameters. For example, listening for packets based on the first set of streams parameters in block 1204 may include listening for packets on the second channel based on a first timing schedule (for example, a first retransmission window schedule). In some implementations, listening for packets based on the first set of stream parameters in block 1204 further includes decoding portions of the packets based on the first set of stream parameters. As shown in FIG. 10, the first communication device may begin receiving packets 1010a modulated according to the first modulation scheme and transmitted based on the first set of stream parameters on the second channel 1004 at time $t_3$. The first wireless communication device may demodulate the packets 1010a based on the first modulation scheme. The first wireless communication device may also modulate packets according to the first modulation scheme and transmit (or output for transmission) the modulated packets to the second wireless communication device via the second channel based on the first set of stream parameters.

Each packet 1010a may be an example of the PDU 220 described with reference to FIG. 2B. As described with reference to FIG. 2B, each packet 1010a may include a rate indicator field that indicates the first modulation scheme used to modulate at least the payload. As is also described above, in implementations in which the second channel is a physical layer channel associated with the CIS link, the payload may be an isochronous payload carrying isochronous data. Additionally, as described with reference to FIG. 5, an isochronous header of each packet may include a length extension field enabling the transmission of a larger isochronous payload by indicating a larger, extended length of the payload.

Referring back to FIG. 12, in block 1206, the process 1200 proceeds with receiving a second packet via the first channel. The second packet indicates a second modulation scheme for transmitting and receiving packets via the second channel. Similar to the first packet, the second packet further indicates a second set of stream parameters associated with the second channel for the transmission and the reception of the packets using the second modulation scheme. As shown in FIG. 10, the first communication device may receive the second packet 1012 in block 1206 via the first channel 1002 at time $t_4$.

As described above, the second packet may not indicate to the first wireless communication device that it should take any actions with respect to the second channel. In other words, in some implementations, the second packet does not indicate to the first wireless communication device that it should begin demodulating packets subsequently received via the second channel based on the second modulation scheme. Similarly, in such implementations, the second packet does not indicate to the first wireless communication device that it should begin using the second set of stream parameters for communications via the second channel. Rather, the second packet serves to inform the first wireless communication device of a second modulation scheme that may be used by the second wireless communication device to modulate packets to be transmitted via the second channel, and to inform the second wireless communication device of the second set of stream parameters to be used in conjunction with the second modulation scheme.

The second modulation scheme may be a second one of the multiple possible modulation and coding scheme modes including, for example, another of the LE 1M, LE 2M, LE Coded, $\pi/4$-QPSK with 1/2 coding, $\pi/14$-QPSK with 3/4 coding, $\pi/4$-DQPSK with no coding, 8PSK with 5/6 coding, or the D8PSK with no coding modes. The second set of stream parameters includes at least one stream parameter that is different than a corresponding stream parameter in the first set of stream parameters, but may generally include multiple different stream parameters. In some implementations in which the second channel is associated with a CIS, the first set of stream parameters includes a first set of CIS parameters, and the second set of stream parameters includes a second set of CIS parameters, the second set of CIS parameters includes at least one CIS parameter that is different than a corresponding CIS parameter in the first set of CIS parameters.

Again, the second packet may be transmitted in the form of a control packet, which may be an example of the PDU 200 described with reference to FIG. 2A having a payload that may be an example of the payload 1100 described with reference to FIG. 11A. Similarly, the second packet includes a modulation scheme field indicating the second modulation scheme and a stream parameters field indicating the second set of stream parameters. For example, the payload of the second packet may include a control data field such as the CtrlData field 1102 described with reference to FIG. 11B. The control data field in the payload of the second packet may include the modulation scheme field, for example, in the form of a PHY information field such as the PHY Info field 1110 described with reference to FIG. 11C, which indicates the second modulation scheme to be used with the second channel. The control data field may also include the stream parameters field, for example, in the form of the CIS parameters field 1112 described with reference to FIG. 11C, which indicates the second set of stream parameters.

In some implementations, after receiving the second packet in block 1206 and identifying the second modulation scheme and the second set of stream parameters, the first wireless communication device may update the mapping table to additionally include a mapping of the second modulation scheme to the second set of stream parameters.

Although not shown in FIG. 12, in some implementations, the first wireless communication device may output for transmission a second response packet via the first channel to the second wireless communication device after receiving the second packet in block 1206. The second response packet may include an indication that the first wireless communication device supports the second modulation scheme and the second set of stream parameters. For example, the second response packet may include control data indicating that the first wireless communication device supports the second modulation scheme and the second set of stream parameters. As shown in FIG. 10, the first communication device may output the second response packet 1014 for transmission via the first channel 1002 at time $t_5$.

In some implementations, after receiving the second packet in block 1206, the first wireless communication device may continue to receive packets via the second channel that are modulated according to the first modulation scheme and transmitted based on the first set of stream parameters. Additionally, the first wireless communication device may continue to modulate packets according to the first modulation scheme and transmit (or output for transmission) the modulated packets to the second wireless communication device via the second channel based on the first set of stream parameters. For example, as shown in FIG. 10, in some instances the first wireless communication device continues to receive packets 1010*a* modulated according to the first modulation scheme and transmitted based on the first set of stream parameters via the second channel.

In block 1208, the first wireless communication device may receive a packet including a payload modulated according to the second modulation scheme via the second channel. The first wireless communication device receives the packet while the links associated with the first and the second channels are maintained. In other words, the first and the second wireless communication devices maintain the connection between them including the first and the second channels while the second wireless communication device switches the modulation of the subsequent packets from the first modulation scheme to the second modulation scheme. As shown in FIG. 10, the first communication device may receive the packet 1010*b* modulated according to the second modulation scheme on the second channel 1004 at time $t_6$.

The process 1200 proceeds in block 1210 with determining the modulation scheme used to modulate the packet 1010*b* based on the modulation scheme field in the packet. The determination in block 1210 may include determining whether the packet 1010*b* is modulated according to the second modulation scheme. For example, the packets 1010*b* may also be examples of the PDU 220 described with reference to FIG. 2B. As described with reference to FIG. 2B, each packet 1010*b* may include a physical layer rate indicator field that indicates the second modulation scheme used to modulate at least the payload of the packet 1010*b*. As described above, in implementations in which the second channel is a physical layer channel associated with the CIS link, the payload may be an isochronous payload carrying isochronous data. Additionally, as described with reference to FIG. 5, an isochronous header of each packet may include a length extension field enabling the transmission of a larger isochronous payload by indicating a larger, extended length of the payload.

The modulation scheme indicated by, for example, the rate indicator field 228 in the packet 1010*b* not only informs the first wireless communication device about how to demodulate the subsequent portions of the packet, but also indicates to the first wireless communication device that the second set of stream parameters are now to be used for communication via the second channel. As shown in FIG. 10, the first wireless communication device may then continue to receive or to transmit packets 1010*b* modulated according to the second modulation scheme and transmitted based on the second set of stream parameters unless, and until, the first wireless communication device receives a packet via the second channel that is modulated according to the first modulation scheme or to another modulation scheme, which would indicate to the first wireless communication device to again switch the set of stream parameters.

If, in block 1210, it is determined that the packet 1010*b* is modulated according to the second modulation scheme, the process 1200 proceeds in block 1212 with demodulating the packet based on the second modulation scheme and, in block 1214, with switching from listening for packets on the second channel based on the first set of stream parameters to listening for packets on the second channel based on the second set of stream parameters. The first wireless communication device is configured to perform the demodulation and switching in blocks 1212 and 1214, respectively, while maintaining the connection with the second wireless communication device. Listening for packets based on the second set of streams parameters in block 1212 may include listening for packets on the second channel based on a second timing schedule (for example, a second retransmission window schedule) different than the first timing schedule associated with the first set of stream parameters. In some implementations, listening for packets based on the second set of stream parameters in block 1212 further includes decoding portions of the packets based on the second set of stream parameters. Additionally, the first wireless communication device may begin to modulate packets according to the second modulation scheme and transmit (or output for transmission) the modulated packets to the second wireless communication device via the second channel based on the second set of stream parameters. In some implementations, to identify the second set of stream parameters, the first wireless communication device queries the mapping table based on the second modulation scheme and identifies the second set of stream parameters based on the mapping stored in the mapping table.

Figure 13:
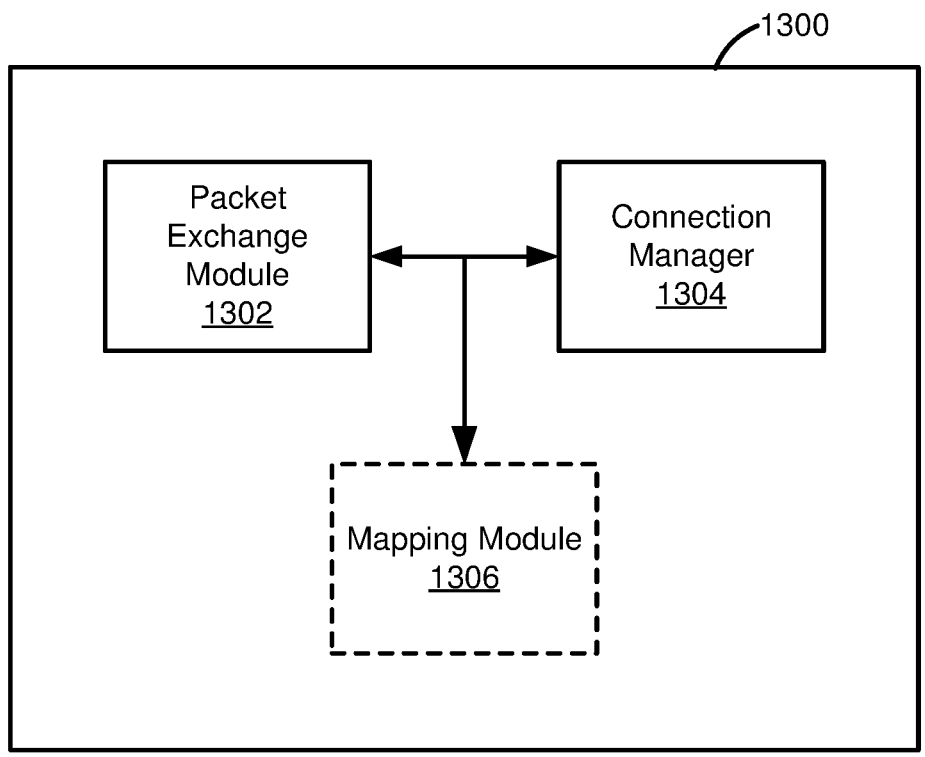
FIG. 13 shows a block diagram of an example wireless communication device for use in wireless communication according to some implementations.

FIG. 13 shows a block diagram of an example wireless communication device 1300 for use in wireless communication according to some implementations. In some implementations, the wireless communication device 1300 is configured to perform the process 900 described above with reference to FIG. 9. In some implementations, the wireless communication device 1300 can be an example implementation of the wireless communication device 600 described above with reference to FIG. 6. For example, the wireless communication device 1300 can be a chip, SoC, chipset, package or device that includes one or more modems (for example, a Bluetooth modem, a Wi-Fi (IEEE 802.11) modem or a cellular modem). In some such implementations, the wireless communication device 1300 can be a device for use in a STA, such as one of the STAs 102 or 800 described above with reference to FIGS. 1 and 8, respectively. For example, the wireless communication device 1300 can be a STA that includes such a chip, SoC, chipset, package or device as well as at least one transmitter, at least one receiver, and at least one antenna.

The wireless communication device 1300 includes a packet exchange module 1302 and a connection manager 1304. In some implementations, the wireless communication device 1300 may further include a mapping module 1308. Portions of one or more of the modules 1302, 1304, and 1306 may be implemented at least in part in hardware or firmware. For example, the packet exchange module 1302 may be implemented at least in part by one or more modems (such as the modem 602). In some implementations, at least some of the modules 1302, 1304, and 1306 are implemented at least in part as software stored in a memory (such as the memory 608). For example, portions of one or more of the modules 1302, 1304, and 1306 can be implemented as non-transitory instructions (or "code") executable by at least one processor (such as the processor 606) to perform the functions or operations of the respective module. In some such implementations, portions of one or more of the modules 1302, 1304, and 1306 can be implemented as at least in part by a MAC layer, such as the MAC layer 700 described with reference to FIG. 7.

The packet exchange module 1302 is generally configured to transmit and receive wireless packets via wireless communication channels. For example, in response to an instruction from the connection manager 1304, the packet exchange module 1302 is configured to transmit, or output for transmission (for example, via a radio and one or more coupled antennas), a first packet via a first channel that indicates a first modulation scheme for transmitting and receiving packets via a second channel. The first packet further indicates a first set of stream parameters (also referred to as "channel parameters" or "configuration settings") associated with the second channel for the transmission and the reception of the packets using the first modulation scheme. For example, the first channel may serve as a control channel governing communications on the second channel, which may serve as a data channel.

The connection manager 1304 is generally configured to manage connections including wireless links with one or more other wireless communication devices. In some implementations, the connection manager 1304 is configured to establish a connection with a second wireless communication device, including the first channel and the second channel, based on the first packet. For example, the wireless communication device 1300 may be a master device relative to the second wireless communication device (which may be a slave device relative to the wireless communication device 1300).

In some implementations, the connection includes an ACL link, and the first channel is a physical layer channel associated with the ACL link. In some implementations, the connection includes a Bluetooth LE CIS link, and the second channel is a physical layer channel associated with the CIS link. In some other implementations, the connection includes an E-SCO link, and the second channel is a physical layer associated with the E-SCO link. In some implementations, the first modulation scheme may be selected from multiple possible modulation and coding scheme modes including, for example, one of the LE 1M, LE 2M, LE Coded, $\pi/14$-QPSK with 1/2 coding, $\pi/14$-QPSK with 3/4 coding, $\pi/14$-DQPSK with no coding, 8PSK with 5/6 coding, or the D8PSK with no coding modes. In some implementations, the first modulation scheme may be an initial or default modulation scheme that is associated with less aggressive modulation, more reliability, greater sensitivity and a relatively low data rate. Similarly, the first set of stream parameters may be a relatively conservative set of stream parameters, for example, stream parameters that may be optimized for or otherwise suitable for the relatively low data rate associated with the first modulation scheme.

In some implementations, the packet exchange module 1302 may transmit, or output for transmission, the first packet in the form of a control packet, which may be an example of the PDU 200 described with reference to FIG. 2A having a payload that may be an example of the payload 1100 described with reference to FIG. 11A. The first packet includes a modulation scheme field indicating the first modulation scheme and a stream parameters field indicating the first set of stream parameters. For example, the payload of the first packet may include a control data field such as the CtrlData field 1102 described with reference to FIG. 11B. The control data field in the payload of the first packet may include the modulation scheme field, for example, in the form of a PHY information field such as the PHY Info field 1110 described with reference to FIG. 11C, which indicates the first modulation scheme to be used with the second channel. The control data field may also include the stream parameters field, for example, in the form of the CIS parameters field 1112 described with reference to FIG. 11C, which indicates the first set of stream parameters.

In some implementations, the packet exchange module 1302 may receive a first response packet via the first channel from the second wireless communication device based on the first packet. The first response packet may include an indication that the second wireless communication device supports the first modulation scheme and the first set of stream parameters. In some implementations, the first response packet is transmitted in the form of a control PDU that includes control data indicating that the second wireless communication device supports the first modulation scheme and the first set of streams parameters. For example, the control PDU may be an example of the PDU 200 described with reference to FIG. 2A, and may include a payload such as the payload 1100 described with reference to FIGS. 11A-11C. The payload may include one or more fields including a CtrlData field indicating the capability to use the first modulation scheme and the first set of stream parameters.

After transmitting the first packet, the packet exchange module 1302 may begin modulating packets according to the first modulation scheme and transmitting, or outputting for transmission, the modulated packets via the second channel based on the first set of stream parameters. Each packet may be an example of the PDU 220 described with reference to FIG. 2B. As described with reference to FIG. 2B, each of the modulated packets may include a rate indicator field that indicates the first modulation scheme used to modulate at least the payload. As described above, in implementations in which the second channel is a physical layer channel associated with a CIS link, the payload may be an isochronous payload carrying isochronous data. Additionally, as described with reference to FIG. 5, an isochronous header of each packet may include a length extension field enabling the transmission of a larger isochronous payload by indicating a larger, extended length of the payload.

To enable the wireless communication device 1300 to later change the modulation scheme and stream parameters to a second modulation scheme and corresponding set of stream parameters, the packet exchange module 1302 may, transmit, or output for transmission, a second packet via the first channel. The second packet may be transmitted any time after the first packet while the links associated with the first and the second channels are maintained. The second packet indicates a second modulation scheme for transmitting and receiving packets via the second channel. Similar to the first packet, the second packet further indicates a second set of stream parameters associated with the second channel for the transmission and the reception of the packets using the second modulation scheme.

The second packet serves to inform the second wireless communication device of a second modulation scheme that may be used by the first wireless communication device to modulate packets to be transmitted via the second channel, and to inform the second wireless communication device of the second set of stream parameters to be used in conjunction with the second modulation scheme. As described with reference to FIGS. 2B and 10, each packet transmitted via the second channel may include a rate indicator field that indicates the modulation scheme used to modulate subsequent portions of the packet including the payload.

The second modulation scheme also may be selected out of the multiple possible modulation and coding scheme modes including, for example, another of the LE 1M, LE 2M, LE Coded, π/4-QPSK with 1/2 coding, π/14-QPSK with 3/4 coding, π/14-DQPSK with no coding, 8PSK with 5/6 coding, or the D8PSK with no coding modes. In some implementations, the second modulation scheme may be associated with more aggressive modulation and a higher data rate than the first modulation scheme. Similarly, the second set of stream parameters may be a relatively more liberal set of stream parameters, for example, stream parameters that may be optimized for or otherwise take advantage of the relatively higher data rate associated with the second modulation scheme. The second set of stream parameters includes at least one stream parameter that is different than a corresponding stream parameter in the first set of stream parameters, but may generally include multiple different stream parameters. In some implementations in which the second channel is associated with a CIS, the first set of stream parameters includes a first set of CIS parameters, and the second set of stream parameters includes a second set of CIS parameters, the second set of CIS parameters includes at least one CIS parameter that is different than a corresponding CIS parameter in the first set of CIS parameters.

The second packet may also be transmitted in the form of a control packet, which may be an example of the PDU 200 described with reference to FIG. 2A having a payload that may be an example of the payload 1100 described with reference to FIG. 11A. Similarly, the second packet includes a modulation scheme field indicating the second modulation scheme and a stream parameters field indicating the second set of stream parameters. For example, the payload of the second packet may include a control data field such as the CtrlData field 1102 described with reference to FIG. 11B. The control data field in the payload of the second packet may include the modulation scheme field, for example, in the form of a PHY information field such as the PHY Info field 1110 described with reference to FIG. 11C, which indicates the second modulation scheme to be used with the second channel. The control data field may also include the stream parameters field, for example, in the form of the CIS parameters field 1112 described with reference to FIG. 11C, which indicates the second set of stream parameters.

In some implementations, the packet exchange module 1302 may receive a second response packet via the first channel from the second wireless communication device based on the second packet. The second response packet may include an indication that the second wireless communication devices supports the second modulation scheme and the second set of stream parameters. For example, the second response packet may include control data indicating that the second wireless communication device supports the second modulation scheme and the second set of stream parameters.

As indicated above, the connection manager 1304 may be configured to periodically determine whether to switch from the first modulation scheme to the second modulation scheme. The determination to switch modulation schemes may be made at any time while the links associated with the first and the second channels are maintained. In some implementations, the connection manager 1304 is generally configured to determine whether to switch among two or more modulation schemes based on channel conditions or various metrics on a periodic basis, such as once per event (for example, isochronous event) interval. In some other instances it may be advantageous to determine whether to switch on a different basis. In some implementations, the determination of whether to switch from the first modulation scheme to the second modulation scheme (or generally from a current modulation scheme to another modulation scheme) is based on one or more of an estimated BER associated with packets transmitted based on the first modulation scheme, an observed ACK rate associated with packets transmitted based on the first modulation scheme, or an observed NACK rate associated with packets transmitted based on the first modulation scheme. The determination may further be based on estimated rates associated with packets to be transmitted based on the second modulation scheme or other modulation schemes, or based on past observed rates associated with packets transmitted based on the second modulation scheme or other modulation schemes.

If the connection manager 1304 determines to switch to the second modulation scheme, it outputs an instruction to the packet exchange module 1302. Subsequently, for the next packet to be transmitted, the packet exchange module 1302 modulates the payload according to the second modulation scheme and transmits, or outputs for transmission, the packet via the second channel based on the second set of stream parameters. In this way, the wireless communication device 1300 and the second wireless communication devices maintain the connection between them including the first and the second channels while the wireless communication device 1300 switches the modulation of the subsequent packets from the first modulation scheme to the second modulation scheme.

This and subsequent packets transmitted via the second channel may also be examples of the PDU 220 described with reference to FIG. 2B. As described with reference to FIG. 2B, these packets may each include a physical layer rate indicator field that indicates the second modulation scheme used to modulate at least the payload of the packet. As described above, in implementations in which the second channel is a physical layer channel associated with the CIS link, the payload may be an isochronous payload carrying isochronous data. The modulation scheme indicated by, for example, the rate indicator field in the packet not only informs the second wireless communication device about how to demodulate the subsequent portions of the packet, but also indicates to the second wireless communication device that the second set of stream parameters are now to be used for communication via the second channel.

The mapping module 1306 is configured to maintain a data structure, for example, in the form of a mapping table, that maps modulation schemes to corresponding sets of stream parameters. For example, the mapping module 1306 may construct a mapping table that maps the first modulation scheme to the first set of stream parameters and that maps the second modulation scheme to the second set of stream parameters. The mapping module 1306 may map any number of additional modulation schemes to corresponding sets of stream parameters.

Figure 14:
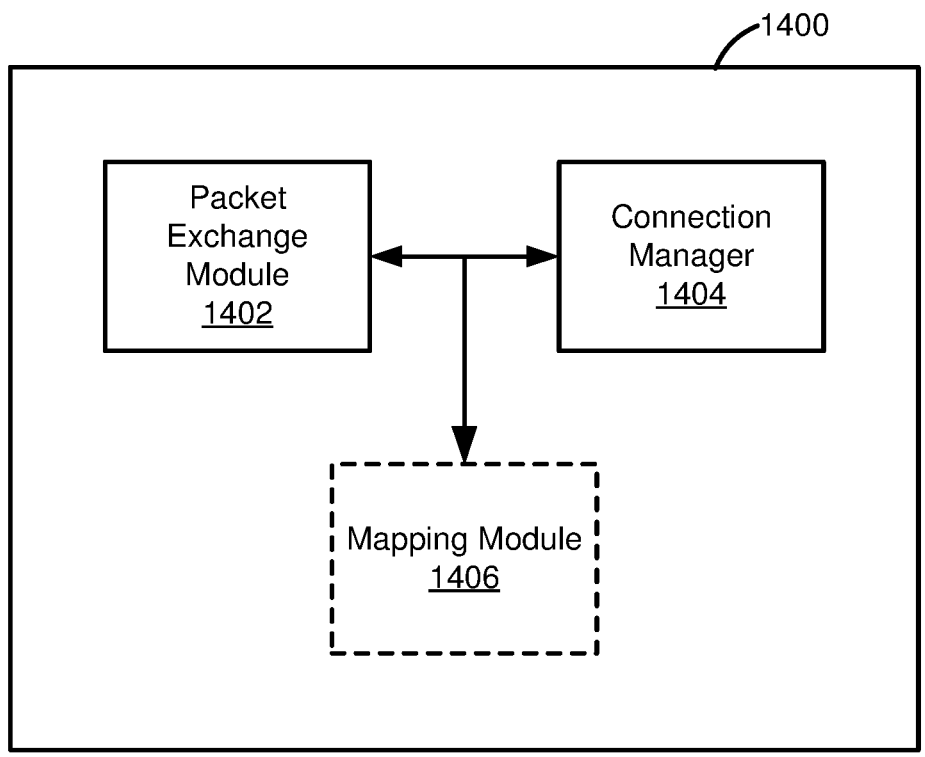
FIG. 14 shows a block diagram of an example wireless communication device for use in wireless communication according to some implementations.

FIG. 14 shows a block diagram of an example wireless communication device 1400 for use in wireless communication according to some implementations. In some implementations, the wireless communication device 1400 is configured to perform the process 1200 described above with reference to FIG. 12. In some implementations, the wireless communication device 1400 can be an example implementation of the wireless communication device 600 described above with reference to FIG. 6. For example, the wireless communication device 1400 can be a chip, SoC, chipset, package or device that includes one or more modems (for example, a Bluetooth modem, a Wi-Fi (IEEE 802.11) modem or a cellular modem). In some such implementations, the wireless communication device 1400 can be a device for use in a STA, such as one of the STAs 102 or 800 described above with reference to FIGS. 1 and 8, respectively. For example, the wireless communication device 1400 can be a STA that includes such a chip, SoC, chipset, package or device as well as at least one transmitter, at least one receiver, and at least one antenna.

The wireless communication device 1400 includes a packet exchange module 1402 and a connection manager 1404. In some implementations, the wireless communication device 1400 may further include a mapping module 1406. Portions of one or more of the modules 1402, 1404, and 1406 may be implemented at least in part in hardware or firmware. For example, the packet exchange module 1402 may be implemented at least in part by one or more modems (such as the modem 602). In some implementations, at least some of the modules 1402, 1404, and 1406 are implemented at least in part as software stored in a memory (such as the memory 608). For example, portions of one or more of the modules 1402, 1404, and 1406 can be implemented as non-transitory instructions (or "code") executable by at least one processor (such as the processor 606) to perform the functions or operations of the respective module. In some such implementations, portions of one or more of the modules 1402, 1404, and 1406 can be implemented as at least in part by a MAC layer, such as the MAC layer 700 described with reference to FIG. 7.

The packet exchange module 1402 is generally configured to transmit and receive wireless packets via wireless communication channels. For example, the packet exchange module 1402 is configured to receive a first packet via a first channel that indicates a first modulation scheme for transmitting and receiving packets via a second channel. The first packet further indicates a first set of stream parameters associated with the second channel for the transmission and the reception of the packets using the first modulation scheme. For example, the first channel may serve as a control channel governing communications on the second channel, which may serve as a data channel.

The packet exchange module 1402 is further configured to receive subsequent packets via the first channel. For example, the packet exchange module 1402 may receive a second packet via the first channel that indicates a second modulation scheme for transmitting and receiving packets via the second channel. Similar to the first packet received on the first channel, the second packet further indicates a second set of stream parameters associated with the second channel for the transmission and the reception of the packets using the second modulation scheme. The second packet may inform the packet exchange module 1402 of the second modulation scheme that may be used by the second wireless communication device to modulate packets to be transmitted via the second channel, as well as of the second set of stream parameters to be used in conjunction with the second modulation scheme.

The connection manager 1404 is generally configured to manage connections including wireless links with one or more other wireless communication devices. In some implementations, the connection manager 1404 is configured to establish a connection with a second wireless communication device, including the first channel and the second channel, based on the first packet. For example, the wireless communication device 1400 may be a slave device relative to the second wireless communication device (which may be a master device relative to the wireless communication device 1400).

In some implementations, the connection includes an ACL link, and the first channel is a physical layer channel associated with the ACL link. In some implementations, the connection includes a Bluetooth LE CIS link, and the second channel is a physical layer channel associated with the CIS link. In some other implementations, the connection includes an E-SCO link, and the second channel is a physical layer associated with the E-SCO link. In some implementations, the first modulation scheme and the second modulation scheme may be selected from multiple possible modulation and coding scheme modes including, for example, one of the LE 1M, LE 2M, LE Coded, $\pi/4$-QPSK with 1/2 coding, $\pi/14$-QPSK with 3/4 coding, $\pi/4$-DQPSK with no coding, 8PSK with 5/6 coding, or the D8PSK with no coding modes. In some implementations, the first modulation scheme may be an initial or default modulation scheme that is associated with less aggressive modulation, more reliability, greater sensitivity and a relatively low data rate. Similarly, the first set of stream parameters may be a relatively conservative set of stream parameters, for example, stream parameters that may be optimized for or otherwise suitable for the relatively low data rate associated with the first modulation scheme. The second set of stream parameters includes at least one stream parameter that is different than a corresponding stream parameter in the first set of stream parameters, but may generally include multiple different stream parameters. In some implementations in which the second channel is associated with a CIS, the first set of stream parameters includes a first set of CIS parameters, and the second set of stream parameters includes a second set of CIS parameters, the second set of CIS parameters includes at least one CIS parameter that is different than a corresponding CIS parameter in the first set of CIS parameters.

In some implementations, each of the first packet and the second packet may be received in the form of a control packet, which may be an example of the PDU 200 described with reference to FIG. 2A having a payload that may be an example of the payload 1100 described with reference to FIG. 11A. Each of the first packet and the second packet may include a modulation scheme field indicating the respective modulation scheme and a stream parameters field indicating the respective set of stream parameters. For example, the payload may include a control data field such as the CtrlData field 1102 described with reference to FIG. 11B. The control data field may include the modulation scheme field, for example, in the form of a PHY information field such as the PHY Info field 1110 described with reference to FIG. 11C, which indicates the modulation scheme to be used with the second channel. The control data field may also include the stream parameters field, for example, in the form of the CIS parameters field 1112 described with reference to FIG. 11C, which indicates the set of stream parameters.

The packet exchange module 1402 may be configured to transmit, or output for transmission, a first response packet via the first channel to the second wireless communication device after receiving the first packet. Similarly, the packet exchange module 1402 may be configured to transmit, or output for transmission, a second response packet via the first channel to the second wireless communication device after receiving the second packet. Each of the first response packet and the second response packet may include an indication that the wireless communication device 1400 supports the respective modulation scheme and the respective set of stream parameters identified in the respective response packet. For example, each of the first response packet and the second response packet may include control data indicating that the wireless communication device 1400 supports the respective modulation scheme and the respective set of stream parameters.

In some implementations, after receiving the first packet and identifying the first modulation scheme and the first set of stream parameters, the packet exchange module 1402 may begin listening for packets on the second channel based on the first set of stream parameters. For example, listening for packets based on the first set of streams parameters in may include listening for packets on the second channel based on a first timing schedule (for example, a first retransmission window schedule). The packet exchange module 1402 demodulates received packets based on the first modulation scheme. In some implementations, listening for packets based on the first set of stream parameters further includes decoding portions of the packets based on the first set of stream parameters. The packet exchange module 1402 also is configured to modulate packets according to the first modulation scheme and transmit, or output for transmission, the modulated packets to the second wireless communication device via the second channel based on the first set of stream parameters.

Each packet received via the second channel may be an example of the PDU 220 described with reference to FIG. 2B. As described with reference to FIG. 2B, the packet may include a rate indicator field that indicates the modulation scheme used to modulate at least the payload of the packet. As described above, in implementations in which the second channel is a physical layer channel associated with the CIS link, the payload may be an isochronous payload carrying isochronous data. Additionally, as described with reference to FIG. 5, an isochronous header of the packet may include a length extension field enabling the transmission of a larger isochronous payload by indicating a larger, extended length of the payload.

After receiving the first and the second packets via the first channel, the packet exchange module 1402 may receive a packet including a payload modulated according to the second modulation scheme via the second channel. The packet exchange module 1402 receives the packet while the links associated with the first and the second channels are maintained. In other words, the first and the second wireless communication devices maintain the connection between them including the first and the second channels while the second wireless communication device switches the modulation of the packets from the first modulation scheme to the second modulation scheme. As indicated above, the packet exchange module 1402 is able to determine the modulation scheme used to modulate the packet based on a modulation scheme field in the packet, for example, such as the physical layer rate indicator field 228 in the PDU 220 described with reference to FIG. 2B.

The modulation scheme indicated by, for example, the rate indicator field in the packet not only informs the packet exchange module 1402 about how to demodulate the subsequent portions of the packet, but also indicates to the packet exchange module 1402 that the second set of stream parameters are now to be used for communication via the second channel. The packet exchange module 1402 may then switch from listening for packets on the second channel based on the first set of stream parameters to listening for packets on the second channel based on the second set of stream parameters. The packet exchange module 1402 is configured to perform the demodulation and switching while maintaining the connection with the second wireless communication device. Listening for packets based on the second set of streams parameters may include listening for packets on the second channel based on a second timing schedule (for example, a second retransmission window schedule) different than the first timing schedule associated with the first set of stream parameters. In some implementations, listening for packets based on the second set of stream parameters further includes decoding portions of the packets based on the second set of stream parameters. Additionally, the packet exchange module 1402 may begin to modulate packets according to the second modulation scheme and transmit (or output for transmission) the modulated packets to the second wireless communication device via the second channel based on the second set of stream parameters.

The mapping module 1406 is configured to maintain a data structure, for example, in the form of a mapping table, that maps modulation schemes to corresponding sets of stream parameters. For example, after receiving the first packet via the first channel and identifying the first modulation scheme and the first set of stream parameters, the mapping module 1406 may generate or update a data structure, for example, in the form of a mapping table, that maps the first modulation scheme to the first set of stream parameters. Similarly, after receiving the second packet via the first channel and identifying the second modulation scheme and the second set of stream parameters, the mapping module 1406 may update the mapping table to additionally include a mapping of the second modulation scheme to the second set of stream parameters.

In some implementations, responsive to the packet exchange module 1402 receiving the packet via the second channel indicating the second modulation scheme, the packet exchange module 1402 sends a request to the mapping module 1406 that includes an identification of the second modulation scheme. The mapping module 1406 queries the mapping table based on the second modulation scheme and identifies the second set of stream parameters based on the mapping stored in the mapping table. The mapping module 1406 then forwards the second set of stream parameters, or an indication of the second set of stream parameters, to the packet exchange module 1402.

As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c.

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

What is claimed is:

1. A method for wireless communication by a first wireless communication device, comprising:
   receiving a first packet from a second wireless communication device via a first channel that indicates a first modulation scheme for transmitting and receiving packets via a second channel, the first packet further indicating a first set of stream parameters associated with the second channel for the transmission and the reception of the packets using the first modulation scheme;
   listening for packets from the second wireless communication device on the second channel based on the first set of stream parameters;
   receiving a second packet from the second wireless communication device via the first channel, the second packet indicating a second modulation scheme for transmitting and receiving packets via the second channel, the second packet further indicating a second set of stream parameters associated with the second channel for the transmission and the reception of the packets using the second modulation scheme, the second set of stream parameters including at least one stream parameter that is different than a corresponding stream parameter in the first set of stream parameters;
   receiving a third packet from the second wireless communication device via the second channel, the third packet including an indication of the second modulation scheme and a payload modulated according to the second modulation scheme;
   determining, by a modem of the first wireless communication device, that the third packet has been modulated according to the second modulation scheme based on the indication; and
   responsive to the determination that the third packet has been modulated according to the second modulation scheme, and while maintaining a link with the second wireless communication device on each of the first channel and the second channel, demodulating, by the modem, the third packet based on the second modulation scheme and switching, by the modem, from listening for packets on the second channel based on the first set of stream parameters to listening for packets on the second channel based on the second set of stream parameters.

2. The method of claim 1, wherein the first channel is associated with an Asynchronous Connection-Oriented link.

3. The method of claim 1, wherein the second channel is associated with a Connected Isochronous Stream (CIS) link.

4. The method of claim 1, wherein each of the first set of stream parameters and the second set of stream parameters includes at least one of a maximum packet size for transmissions to the second wireless communication device, a maximum packet size for transmissions from the second wireless communication device, a maximum number of subevents in each isochronous interval, a subevent interval, a burst number for transmissions to the second wireless communication device, a burst number for transmissions from the second wireless communication device, a flush timeout for transmissions to the second wireless communication device, a flush timeout for transmissions from the second wireless communication device, or an isochronous channel interval.

5. The method of claim 1, further comprising:
   transmitting a first response packet to the second wireless communication device via the first channel, the first response packet including an indication that the first wireless communication device supports the first modulation scheme and the first set of stream parameters; and
   transmitting a second response packet to the second wireless communication device via the first channel, the second response packet including an indication that the first wireless communication device supports the second modulation scheme and the second set of stream parameters.

6. The method of claim 1, wherein the third packet includes a physical layer field and a subsequent physical layer payload, the physical layer field including a modulation scheme field that indicates the second modulation scheme used to modulate the physical layer payload.

7. The method of claim 1, further comprising updating a mapping table that maps modulation schemes to corresponding sets of stream parameters, the updating including mapping the first modulation scheme to the first set of stream parameters and mapping the second modulation scheme to the second set of stream parameters, wherein the switching from the listening for packets based on the first set of stream parameters to the listening for packets based on the second set of stream parameters comprises querying the mapping table based on the second modulation scheme and identifying the second set of stream parameters based on the querying.

8. A wireless communication device comprising:
   at least one modem;
   at least one processor coupled with the at least one modem; and
   at least one memory communicatively coupled with the at least one processor and storing processor-readable code that, when executed by the at least one processor, is configured to cause the wireless communication device to:

receiving a first packet from a second wireless communication device via a first channel that indicates a first modulation scheme for transmitting and receiving packets via a second channel, the first packet further indicating a first set of stream parameters associated with the second channel for the transmission and the reception of the packets using the first modulation scheme;

listen for packets from the second wireless communication device on the second channel based on the first set of stream parameters;

receive a second packet from the second wireless communication device via the first channel, the second packet indicating a second modulation scheme for transmitting and receiving packets via the second channel, the second packet further indicating a second set of stream parameters associated with the second channel for the transmission and the reception of the packets using the second modulation scheme, the second set of stream parameters including at least one stream parameter that is different than a corresponding stream parameter in the first set of stream parameters;

receive a third packet from the second wireless communication device via the second channel, the third packet including an indication of the second modulation scheme and a payload modulated according to the second modulation scheme;

determine that the third packet has been modulated according to the second modulation scheme based on the indication; and responsive to the determination that the third packet has been modulated according to the second modulation scheme, and while maintaining a link with the second wireless communication device on each of the first channel and the second channel, demodulate the third packet based on the second modulation scheme and switch from listening for packets on the second channel based on the first set of stream parameters to listening for packets on the second channel based on the second set of stream parameters.

9. The wireless communication device of claim 8, wherein the first channel is associated with an Asynchronous Connection-Oriented link.

10. The wireless communication device of claim 8, wherein the second channel is associated with a Connected Isochronous Stream (CIS) link.

11. The wireless communication device of claim 8, wherein each of the first set of stream parameters and the second set of stream parameters includes at least one of a maximum packet size for transmissions to the second wireless communication device, a maximum packet size for transmissions from the second wireless communication device, a maximum number of subevents in each isochronous interval, a subevent interval, a burst number for transmissions to the second wireless communication device, a burst number for transmissions from the second wireless communication device, a flush timeout for transmissions to the second wireless communication device, a flush timeout for transmissions from the second wireless communication device, or an isochronous channel interval.

12. The wireless communication device of claim 8, wherein the processor-readable code is further configured to cause the wireless communication device to:

transmit a first response packet to the second wireless communication device via the first channel, the first response packet including an indication that the first wireless communication device supports the first modulation scheme and the first set of stream parameters; and transmit a second response packet to the second wireless communication device via the first channel, the second response packet including an indication that the first wireless communication device supports the second modulation scheme and the second set of stream parameters.

13. The wireless communication device of claim 8, wherein the third packet includes a physical layer field and a subsequent physical layer payload, the physical layer field including a modulation scheme field that indicates the second modulation scheme used to modulate the physical layer payload.

14. The wireless communication device of claim 8, wherein the processor-readable code is further configured to cause the wireless communication device to update a mapping table that maps modulation schemes to corresponding sets of stream parameters, the updating including mapping the first modulation scheme to the first set of stream parameters and mapping the second modulation scheme to the second set of stream parameters, wherein the switching from the listening for packets based on the first set of stream parameters to the listening for packets based on the second set of stream parameters comprises querying the mapping table based on the second modulation scheme and identifying the second set of stream parameters based on the querying.

15. The wireless communication device of claim 8, further comprising:

one or more transceivers coupled to the at least one modem;

one or more antennas coupled to the one or more transceivers to wirelessly transmit signals output from the transceivers and to wirelessly receive signals for input into the transceivers; and a housing that encompasses the wireless communication device, the one or more transceivers and at least a portion of the one or more antennas.

16. A method for wireless communication by a first wireless communication device, comprising:

transmitting a first packet to a second wireless communication device via a first channel that indicates a first modulation scheme for transmitting and receiving packets via a second channel, the first packet further indicating a first set of stream parameters associated with the second channel for the transmission and the reception of the packets using the first modulation scheme;

transmitting a second packet to the second wireless communication device via the first channel, the second packet indicating a second modulation scheme for transmitting and receiving packets via the second channel, the second packet further indicating a second set of stream parameters associated with the second channel for the transmission and the reception of the packets using the second modulation scheme, the second set of stream parameters including at least one stream parameter that is different than a corresponding stream parameter in the first set of stream parameters;

determining, by a link manager, whether to switch from the first modulation scheme to the second modulation scheme for transmitting and receiving packets via the second channel; and based on determining to switch from the first modulation scheme to the second modulation scheme, and while maintaining a link with the second wireless communication device on each of the first channel and the second channel, transmitting a third packet to the second wireless communication device via the second channel based on the second set of stream parameters, the third packet including a payload modulated according to the second modulation scheme, the third packet including a modulation scheme field that indicates the second modulation scheme.

17. The method of claim 16, wherein the first channel is associated with an Asynchronous Connection-Oriented link.

18. The method of claim 16, wherein the second channel is associated with a Connected Isochronous Stream (CIS) link.

19. The method of claim 16, wherein each of the first set of stream parameters and the second set of stream parameters includes at least one of a maximum packet size for transmissions to the second wireless communication device, a maximum packet size for transmissions from the second wireless communication device, a maximum number of subevents in each isochronous interval, a subevent interval, a burst number for transmissions to the second wireless communication device, a burst number for transmissions from the second wireless communication device, a flush timeout for transmissions to the second wireless communication device, a flush timeout for transmissions from the second wireless communication device, or an isochronous channel interval.

20. The method of claim 16, further comprising:
receiving a first response packet from the second wireless communication device via the first channel, the first response packet including an indication that the second wireless communication device supports the first modulation scheme and the first set of stream parameters; and
receiving a second response packet from the second wireless communication device via the first channel, the second response packet including an indication that the second wireless communication device supports the second modulation scheme and the second set of stream parameters.

21. The method of claim 16, wherein the third packet includes a physical layer field and a subsequent physical layer payload, the physical layer field including the modulation scheme field that indicates the second modulation scheme used to modulate the physical layer payload.

22. The method of claim 16, further comprising maintaining a mapping table that maps modulation schemes to corresponding sets of stream parameters, the mapping table mapping the first modulation scheme to the first set of stream parameters and mapping the second modulation scheme to the second set of stream parameters.

23. The method of claim 16, further comprising determining at least one channel condition of the second channel, wherein the determination of whether to switch from the first modulation scheme to the second modulation scheme is based on the at least one channel condition.

24. A wireless communication device comprising:
at least one modem;
at least one processor coupled with the at least one modem; and
at least one memory communicatively coupled with the at least one processor and storing processor-readable code that, when executed by the at least one processor, is configured to cause the wireless communication device to:
transmit a first packet to a second wireless communication device via a first channel that indicates a first modulation scheme for transmitting and receiving packets via a second channel, the first packet further indicating a first set of stream parameters associated with the second channel for the transmission and the reception of the packets using the first modulation scheme;
transmit a second packet to the second wireless communication device via the first channel, the second packet indicating a second modulation scheme for transmitting and receiving packets via the second channel, the second packet further indicating a second set of stream parameters associated with the second channel for the transmission and the reception of the packets using the second modulation scheme, the second set of stream parameters including at least one stream parameter that is different than a corresponding stream parameter in the first set of stream parameters;
determining whether to switch from the first modulation scheme to the second modulation scheme for transmitting and receiving packets via the second channel; and
based on determining to switch from the first modulation scheme to the second modulation scheme, and while maintaining a link with the second wireless communication device on each of the first channel and the second channel, transmit a third packet to the second wireless communication device via the second channel based on the second set of stream parameters, the third packet including a payload modulated according to the second modulation scheme, the third packet including a modulation scheme field that indicates the second modulation scheme.

25. The wireless communication device of claim 24, wherein the first channel is associated with an Asynchronous Connection-Oriented link.

26. The wireless communication device of claim 24, wherein the second channel is associated with a Connected Isochronous Stream (CIS) link.

27. The wireless communication device of claim 24, wherein each of the first set of stream parameters and the second set of stream parameters includes at least one of a maximum packet size for transmissions to the second wireless communication device, a maximum packet size for transmissions from the second wireless communication device, a maximum number of subevents in each isochronous interval, a subevent interval, a burst number for transmissions to the second wireless communication device, a burst number for transmissions from the second wireless communication device, a flush timeout for transmissions to the second wireless communication device, a flush timeout for transmissions from the second wireless communication device, or an isochronous channel interval.

28. The wireless communication device of claim 24, wherein the processor-readable code is further configured to cause the wireless communication device to:
receive a first response packet from the second wireless communication device via the first channel, the first response packet including an indication that the second wireless communication device supports the first modulation scheme and the first set of stream parameters; and receive a second response packet from the second wireless communication device via the first channel, the second response packet including an indication that the second wireless communication device supports the second modulation scheme and the second set of stream parameters.

29. The wireless communication device of claim 24, wherein the third packet includes a physical layer field and a subsequent physical layer payload, the physical layer field including the modulation scheme field that indicates the second modulation scheme used to modulate the physical layer payload.

30. The wireless communication device of claim 24, wherein the processor-readable code is further configured to maintain a mapping table that maps modulation schemes to corresponding sets of stream parameters, the mapping table mapping the first modulation scheme to the first set of stream parameters and mapping the second modulation scheme to the second set of stream parameters.

31. The wireless communication device of claim 24, wherein the processor-readable code is further configured to determine at least one channel condition of the second channel, wherein the determination of whether to switch from the first modulation scheme to the second modulation scheme is based on the at least one channel condition.

32. The wireless communication device of claim 24, further comprising:
- one or more transceivers coupled to the at least one modem;
- one or more antennas coupled to the one or more transceivers to wirelessly transmit signals output from the transceivers and to wirelessly receive signals for input into the transceivers; and
- a housing that encompasses the wireless communication device, the one or more transceivers and at least a portion of the one or more antennas.

* * * * *